US008665911B2

(12) United States Patent
Law et al.

(10) Patent No.: US 8,665,911 B2
(45) Date of Patent: *Mar. 4, 2014

(54) SIGNATURE CHECKING USING DETERMINISTIC FINITE STATE MACHINES

(71) Applicant: Hewlett-Packard Development Company, L.P., Houston, TX (US)

(72) Inventors: David Law, East Lothian (GB); Edele O'Malley, Dublin (IE); Daniel Martin O'Keeffe, Dublin (IE); Eugene O'Neill, Dublin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,001

(22) Filed: Nov. 2, 2012

(65) Prior Publication Data

US 2013/0061324 A1 Mar. 7, 2013

Related U.S. Application Data

(62) Division of application No. 11/923,869, filed on Oct. 25, 2007, now Pat. No. 8,331,404.

(30) Foreign Application Priority Data

Oct. 27, 2006 (GB) .................................. 0621356.5

(51) Int. Cl.
*H04J 1/02* (2006.01)
(52) U.S. Cl.
USPC .............................. 370/497; 370/488; 726/22
(58) Field of Classification Search
USPC ............ 370/290, 291, 392, 488, 497; 726/22, 726/23, 13, 24, 25; 709/224
See application file for complete search history.

(56) References Cited

U.S. PATENT DOCUMENTS

| | | | |
|---|---|---|---|
| 5,784,298 A | 7/1998 | Hershey et al. | |
| 6,598,034 B1 * | 7/2003 | Kloth | 706/47 |
| 6,789,116 B1 * | 9/2004 | Sarkissian et al. | 709/224 |
| 7,613,755 B1 * | 11/2009 | Venkatachary | 708/212 |
| 2004/0162826 A1 * | 8/2004 | Wyschogrod et al. | 707/6 |
| 2004/0202190 A1 * | 10/2004 | Ricciulli | 370/410 |

(Continued)

FOREIGN PATENT DOCUMENTS

WO WO 03/065686 8/2003

OTHER PUBLICATIONS

Hongbin, Lu et al. "A Memory-Efficient Parallel String Matching Architecture for High-Speed Intrusion Detection," IEEE Journal on Selected Areas in Communications, vol. 24, No. 10, Oct. 2006.

*Primary Examiner* — Hassan Phillips
*Assistant Examiner* — Ajay Cattungal

(57) ABSTRACT

The occurrence of false positives and the post-processing of digital streams subjected to examination by a deterministic finite state machine for character strings are reduced by combining location-based pattern matching, e.g. on packet headers, and content-based pattern matching, e.g. on payloads of packets. One scheme allows automatic transition from a header match state into an initial state of a content matching machine. Another scheme is based on a rules graph defining strings of match states and the examination of a list of match states (rather than characters) which have been previously determined, for example by means of header matching and content matching. The latter is also capable of comparing offset and depth values associated with the match states with offset and depth criteria.

20 Claims, 18 Drawing Sheets

(56) References Cited

U.S. PATENT DOCUMENTS

2006/0170945 A1* 8/2006 Bill ............................ 358/1.13
2007/0006293 A1* 1/2007 Balakrishnan et al. ......... 726/13
2007/0143846 A1* 6/2007 Lu ................................. 726/23
2007/0217518 A1* 9/2007 Valmiki et al. ........... 375/240.24
2008/0037545 A1* 2/2008 Lansing et al. ............... 370/392
2010/0014534 A1* 1/2010 Bennett ......................... 370/401

* cited by examiner

SIGNATURE CHECKING USING DETERMINISTIC FINITE STATE MACHINES

This application is a Continuation (Divisional) application of U.S. patent application Ser. No. 11/923,869, filed Oct. 25, 2007, which claims the benefit of GB Patent Application Serial No. 0621356.5, filed on Oct. 27, 2006, entitled "Signature checking using deterministic finite state machines". The disclosures of these documents are hereby incorporated by reference in their entireties.

FIELD OF THE INVENTION

This invention primarily relates to the detection of digital patterns or signatures, particularly in a succession of addressed data packets, that is to say packets which include a header, that customarily includes data fields identifying a source and a destination (or group of destinations) for the packet, data identifying the transmission protocol under which the packet is transmitted and a payload. The invention also applies to packets which are themselves included as payloads within other packets, as in virtual private networks and tunnelling and also applies to packets which may be encrypted.

BACKGROUND TO THE INVENTION

Network security systems, often described as intrusion prevention systems (IPS) or intrusion detection systems (IDS) commonly employ both pattern matching, performed on a data stream represented by the packet payload, and the checking of headers to detect unwanted or undesirable digital signatures which may represent a security threat. Within the security rules used by such systems there are normally links between specific header values and the security thread content in the payload. For example, a pattern that may be significant (e.g. because it represents a potential threat) in one type of packet (e.g. a UDP packet) may not be important in another type (e.g. a TCP packet). When a pattern is detected but, having regard to its context, is not significant, it is generally termed a 'false positive'. The production and elimination of false positive represent severe processing overhead in detection systems.

Accordingly it is not only necessary to detect the signature but also to 'post-process' the header to check for the header value qualifiers which confirm the 'authenticity' of a potential violation of security. In many cases there are several header fields which must match a specific value in order to determine that a genuine positive match has been obtained.

A deterministic finite automata (DFA), or deterministic finite state machine, as represented in graphical form, has a plurality of states each of which has an exit or transition dependent on an examination of the next 'character' or 'byte' in a string of characters that the DFA examines. In one practical form, each state of the DFA is represented by one or more locations in a memory, each location containing an identification of the pattern segment that must be detected by a comparator and an identification of the state to which the state machine will transition if there is a match on that character. Customarily, if there is no match, or under various other circumstances, the state machine reverts to an initial state.

In its simplest practical form, termed a single table machine, a DFA comprises, for each state, a multiplicity of locations showing the next state for each of the possible variations of an input character. Where, as is typical, an input character is a byte, a single table machine requires 256 locations, only one of which will identify a state other than the initial or default state. Thus the memory space required for a single table machine is in practice unmanageably large.

As will be described later, the present invention preferably employs a dual table machine. However, some elaborations of the present invention would greatly enlarge the memory space if a dual table machine is used and therefore the invention is not intended for implementation exclusively by a dual-table machine.

SUMMARY OF THE STATE OF THE ART

Current methods for the detection of digital signatures in addressed packets separate the analyses of the payload and the header of a packet. Such a separation is inefficient and significantly increases the number of false positives detected by the system. Post processing also increases latency through the detection system. The main reason for the separation of the tasks of analysis of the payload and analysis of the header is due to the characteristics of a standard DFA graph. This does not support location-based searching. A standard DFA searches for all patterns in the DFA graph in a continuous stream but cannot stop searching for a pattern after, for example, a specific number of bytes. An ordinary graph includes return transitions from many states at least to a default state. Accordingly the current process for header and pattern matching normally comprises three distinct stages. First, a 'content' DFA is employed to identify pattern matches in a payload. Second, the header is checked in a rules checker. Third, the pattern matches and header matches are cross-checked in a rule checker.

A further feature of current methods is the customary need to perform post-processing to determine whether significant predetermined patterns (which can be detected by a DFA) actually occur at a particular offset in a packet.

SUMMARY OF THE INVENTION

The general objective of the invention is to reduce the need for post-processing, particularly by means software and thereby to enable most if not necessarily all the header and content checking to be performed in a hardware machine and particularly a DFA.

One aspect of the invention concerns the combination of the operation of a header checking DFA and a content DFA. In our copending GB application No. 0617232.4 filed 1 Sep. 2006 we describe improved DFAs which support location-based searching and in particular the detection of location-dependent matches in packet headers. A preferred form of header DFA for this purpose differs from a normal 'content' DFA in at least two and preferably three ways. First, the header DFA graph will contain only forward paths; it will not have a transition from any state to a state that could previously have been entered. Second, there will be a transition from each state to another state for each possible header character. In some cases this transition will be a 'don't care' transition if that particular byte of the header is not of interest to any of the rules relating to the header. Thirdly, if a state is reached in the graph where there is not a don't care transition out, and an incoming byte does not meet any of the conditions for transitions from the state, the transit of the graph may be halted, because there has now been a determination that the incoming header does not match any of the patterns of interest.

Such a 'header' DFA may be used to reduce substantially the task of post processing even if the matches obtained from a content DFA and a header DFA are separate inputs to a post-processor.

Combined Header and Content DFAs

A 'rule' usually consists of two possible parts, a 'header' rule, which is always present, and a 'content' rule, which may or may not be present. Normally, as part of the header rule checking the type of the packet needs to be determined (TCP, UDP, ICMP, etc.) as this is normally part of each rule. This means that if a match state is reached in the header DFA, the type of the packet has at that point been determined. Now since each content rule has an associated header rule and each header rule includes a packet type it would be possible to sort the various content rules into groups associated with each packet type. An individual DFA graph could then be constructed to perform the content rule search for each packet type.

This could provide an advantage over a single content rule DFA graph, which includes all content rules, as false positives for content that is only relevant to other packet types would not longer occur. This should in turn reduce the amount of post-processing required on the header and content rule matches returned.

Thus one aspect of the present invention is to link a header DFA match state to the initial state of a respective content DFA graph for that packet type. This link would be programmed into the DFA graph as an unconditional transition, which is a default state with no next state. In some cases of course a header match is all that is required for a rules match. In these cases a link to a content DFA graph for that packet type will not be required.

There is another option in which each possible header rule match has an associated content DFA. Hence there will be as many content DFAs as there are header rules matches states, but each of these content DFAs will be much smaller than the packet type content DFAs described above.

In the versions of the invention noted above, a combined DFA can provide a further significant reduction in false positives. It can prove that the identified header patterns (in their correct positions) and associated content patterns are present but does not necessarily prove that they all (including the content matches) are at their correct positions if this be relevant, so the post-processing stage is still required.

Rules DFA

It will be understood that the operation of a DFA is in practice, at each stage, examining an input value in a stream and accessing a respective location in memory, this location depending on the input value and the current state of the machine, the location defining a next state or a match or the absence of a match for the string, these two latter also being represented by memory locations. More generally put, the machine makes transitions on the basis of a predetermined program which relies only on the current state and an input value. It is feasible, and necessary, to limit the possible range of input values so that the machine can be properly organised.

The results obtained from the operation of a header DFA and a content DFA are in essence a list of numbers each representing a match state. For the header DFA the result, as will be apparent from further description herein, is a match state in a header graph as the packet header is processed. For the content DFA the results are the match states reached in the graph and the respective offset into the payload stream where the matches occur. In general there will be a multiplicity of such states and corresponding offsets because a content DFA reverts to a default state even on the detection of a match.

According to a further aspect of the invention, a DFA state machine is organised to perform a pattern match by examination of a string of header and content matches. In this aspect of the invention the patterns for which search is made is not a list of incoming characters, but is a list of previously determined match states each of which connotes the detection of a pattern match. Since the patterns for which search its made are patterns, each defined by a respective 'rule', of header and content match states the relevant graph may be termed a rules graph and the DFA a rules DFA.

In a simple form a Rules DFA again provides a reduction in false positives, because although it demonstrates that 'correct' header and content matches have been detected it does not necessarily prove that the content patterns have occurred at their correct offsets in the packet payload, if this be relevant.

However, by allocating respective memory space defined by programmable pointers and organising the allocation of state numbers, it is possible to define blocks of state numbers which can perform special tasks defined according to whether they fall within a specified range. One example of such a special instruction is to define an offset and depth check which may be used in conjunction with an offset and depth value stored in memory against the respective match state. This enables the Rule DFA to determine not only that the states which it examines conform to a predetermined sequence corresponding to a sequence of pattern matches but also that the positions of the pattern matches correspond to the requirements of a rule.

Further features of the invention will become apparent from the following detailed description which is given by way of example and refers to the accompanying drawings which illustrate, among other things, specific embodiments of the invention.

DETAILED DESCRIPTION

In general a Finite Automata, i.e. a Non-deterministic Finite Automata (NFA) or Deterministic Finite Automata (DFA) is a state machine consisting of a set of states with transitions between the states controlled by the incoming character, which in practice means the numerical value of a digital expression representing the value of the character. One state is designated the initial state and one or more states are designated match states. The state machine starts in the initial state and each character of an input string of characters, e.g. a data packet, is processed by transitions through the state diagram. A Finite Automata (FA) either accepts or rejects an input string, the string is accepted if the FA reaches a match state, and rejects the string it if the FA does not reach a match state. It is convenient, though not essential, for each character to be represented by a single 'byte', and this representation is presumed herein.

A DFA is the simplest form of FA with no more than one transition from a state dependent on a single character. This means that a DFA can only ever be in one state at a time and therefore lends itself to implementation in a Finite State Machine (FSM).

An NFA is similar to a DFA with the exception that in a NFA, a single character input can lead to zero, one or more transitions from that a state. The important difference is that there can be more than one transition from a state on input of a character, this means that a NFA can be 'in' multiple states at any point of time—that is what makes it 'non-deterministic'. An NFA also supports 'ϵ' (epsilon) transitions, namely transitions on an empty string. These transitions allow an NFA to transition from one state to another instantaneously without consuming an input character. They are used as a programming convenience, for example when converting Regular Expressions to NFAs, but can be eliminated from a NFA through optimisation.

NFAs are more difficult to implement in hardware, or software, than a DFA owing to their ability to be in multiple states at any one time. This also presents a difficulty for stream based processing where the stream is contained in several packets, because saving the context of the NFA between packets will consume more storage space than for a DFA, which only requires the storage of a single state.

One method of converting a set of Regular Expressions to a DFA comprises three steps. A first step is to convert the Regular Expressions into to an NFA. A second step is to convert the NFA to a DFA. The third step is to minimise the DFA. Once the minimised DFA is obtained it can then be implemented in a Finite State Machine (FSM).

The development of a DFA from a set of Regular Expression by way of an NFA is described in our prior copending GB application No. 0617232.4 and need not be further described here.

Examples of DFAs

Figure 1:
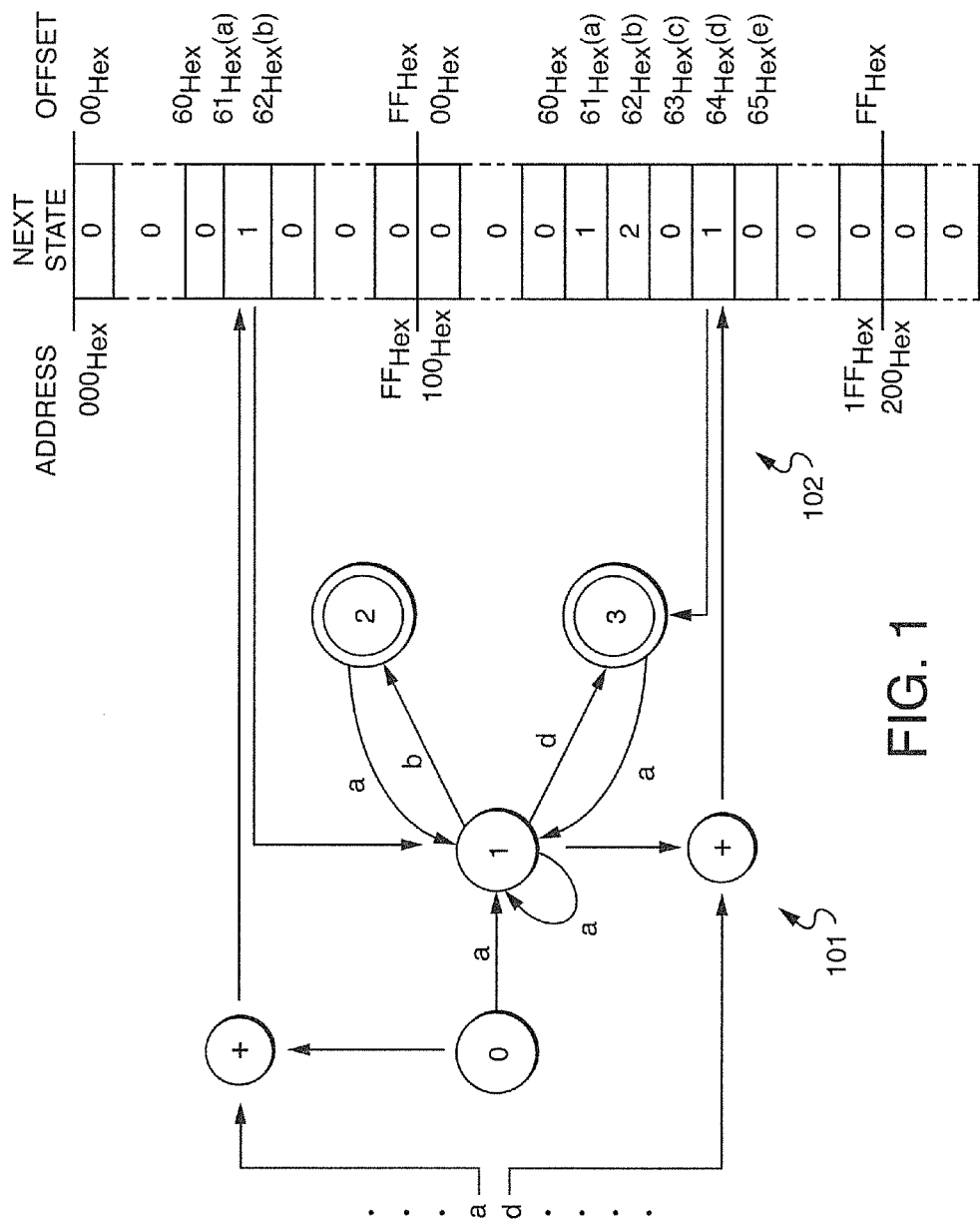
FIG. 1 illustrates for the sake of explanation a single table DFA

In its simplest form the FSM implementation of the DFA, assuming an 8-bit character set, can consist of a 256 entries in memory for each state. The algorithm used is that the value of incoming character is added to current state value multiplied by 0x100. This value will then point to an entry in the table that will provide the next state value. FIG. 1 illustrates for convenience a simple (ordinary) DFA 101 for the character strings 'ab' and 'ad'. State 0 is the initial state and states 2 and 3 are match states for the two character strings. The memory locations 102 are shown to the right and are annotated with address and offset and the pointer value (to the next state) which is respectively stored. Figure omits for convenience and as is customary the reverse transitions from states 1 and 2 to the initial default state 0.

The DFA starts up in its initial state, state 0. This state, multiplied by 0x100, is added to the incoming character value, in this example lower case 'a', the hex value 0x061. This operation is schematically represented by the + symbol.

The resultant value is used to index into the 'table' 102 and this returns the next state value, in this case state 1. The DFA is then in state 1 and when the next character, a lower case 'd', is input, this state 1 is multiplied by 0x100 and added to the incoming character value 0x064 to yield 0x164 where the next state value of state 3 is found, and so on.

The table per state FSM implementation provides the highest speed implementation of a DFA, requiring only a single memory access for each character received. The price paid for this speed however is the amount of memory it needs. For the example in FIG. 1, four states will require 256×4=1024 entries whereas there are only six transitions that are non default, i.e. not to state zero. In the case of a header DFA where there are only forward transitions, there would be only three transitions that are not to a 'no match' state.

Dual Table FSM Implementation

In this FSM implementation of a DFA two tables are provided in memory, a 'Default and Base' table and a 'Next and Check' table. The first table, the 'Default and Base' table, provides two values, a 'default' state to which to transition and a 'base' pointer. The 'base' pointer is offset by the value of the incoming character to access a particular entry in the 'next and check' table. The second table, the 'Next and Check' table, also contains two values, a 'next' state to transition to and a 'check' state value that is compared against the state value.

The usual algorithm used is that on input of a new character the 'default and base' value is read and the 'default' value stored. The incoming character is then used to offset the 'Base' value to read an entry from the 'Next and Check' table. The 'Check' value is then compared with the current state. If the check value and the current state match, the DFA executes the transition to the specified 'Next' state; if they do not match the DFA transitions to the 'default' state stored from the reading of the 'Default and Base' table.

The size of the 'Default and Base' table has to be equal to the number of states in the DFA. The size of the 'Next and Check' table is dependent on the number of transitions. If there is a small number of transitions out of each state the 'Next and Check' table will be quite small. The worst case occurs if every state in the DFA has a different transition out for every possible character, when the 'Next and Check' table could grow to be as large as the simple transition table approach, but this is generally unlikely.

Figure 2:
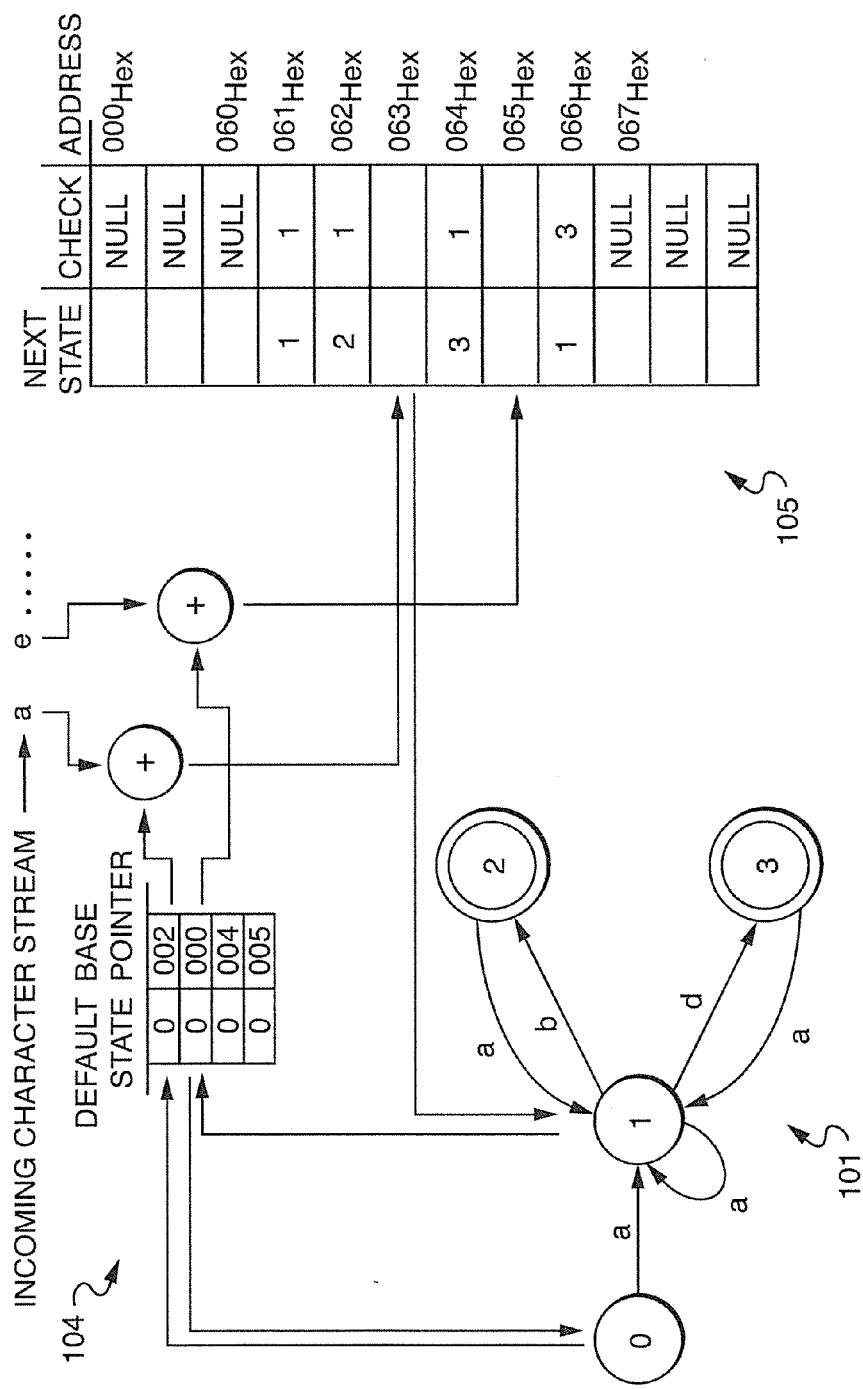
FIG. 2 illustrates a dual table DFA

FIG. 2 illustrates the operation of a simple dual table DFA based on the same graph 101 as in FIG. 1, but implemented using two tables, a default and base table 104 and a 'next and check table 105. The table 104 has, as described above, an entry for each state in the DFA. In this case therefore there are four entries. Each (in this case) has a stored default value of 0, indicating that the default state is state 0, and a pointer, denoted 002, 000, 004 etc. The actual values of these pointer are 0x002, 0x000 etc in hex terms. The + symbols denote the addition of a hex value of an incoming character to a base pointer value from the Default and Base Table 104, as before.

Initially, the DFA starts up in its initial state, state 0. The first incoming character is a lower case 'a', which has the hex value 0x061. On receiving this character the 'default and base' table entry for state 0 is read and the base pointer value, in this case 0x002, is added to the value (0x061) of the incoming character 0x061 to yield the value 0x063. The 'next and check' table entry at offset 0x063 (i.e. $063_{Hex}$) is then read and the check value, in this case state 0, is compared against the current state also state 0. Since these vales are equal the DFA moves to the state recorded as the associated 'next' value in the 'next and check' table. This is state 1.

The DFA is now in state 1 and the incoming character is a lower case 'e', the hex value of which is 0x065. On receiving this character the 'default and base' table entry for state 1 (the second from the top) is now read and the base value, in this case 0x000, is added to the value if the incoming character 0x065 to yield the value 0x065. The 'next and check' table entry at offset 0x065 is then read and the check value, in this case state 2, is compared against the current state, state 1. Since these values are different, the entry accessed actually relates to state 2, the 'next state' value is ignored and instead the default state value (0) read during the access to the 'default and base' table is used, so that the DFA returns to state 0.

Header DFAs

As previously mentioned, an ordinary DFA does not support location-based searching. However, pattern matches in the header of an addressed packet require not only the detection of the relevant character string, but also the location of that character string in the header of a packet. As indicated above, any given pattern (whether representing a threat or not) in the header of a packet varies in significance because headers are necessarily organised such that different fields have a meaning dependent not only on their content but also on their location, i.e. their offset from the start of the packet. For example, the header of a packet conforming to IPv6 (Internet Protocol, version six) comprises 40 bytes comprising, in order, a byte identifying the version (in this case the binary equivalent of 6), a byte identifying a traffic class, two bytes constituting a flow label, two bytes specifying the length of the payload, a 'next header' byte identifying the protocol (e.g. TCP or UDP), to which the contents (payload) of the packet will be delivered, a byte specifying the hop limit, a 16-byte source address and a 16-byte destination address. It follows that a given pattern of characters (i.e. bytes) requires a knowledge of the offset from the start of the packet for the determination of its significance.

A DFA suitable for location-based searching in header of a packet may be provided by modifying the DFA graph from that of a normal 'content' DFA in two and preferably three ways. First, the DFA graph will contain only forward paths; it will not have a transition from any state to a state that could previously have been entered. Second, there will be transition from each state to another state for each possible header character. In some cases this transition will be a 'don't care' transition if that particular byte of the header is not of interest to any of the rules relating to the header. Thirdly, if a state is reached in the graph where there is not a don't care transition out, and an incoming byte does not meet any of the conditions for transitions from the state, the transit of the graph can be halted, because there has now been a determination that the incoming header does not match any of the patterns of interest.

Hardware Implementation

Figure 3:
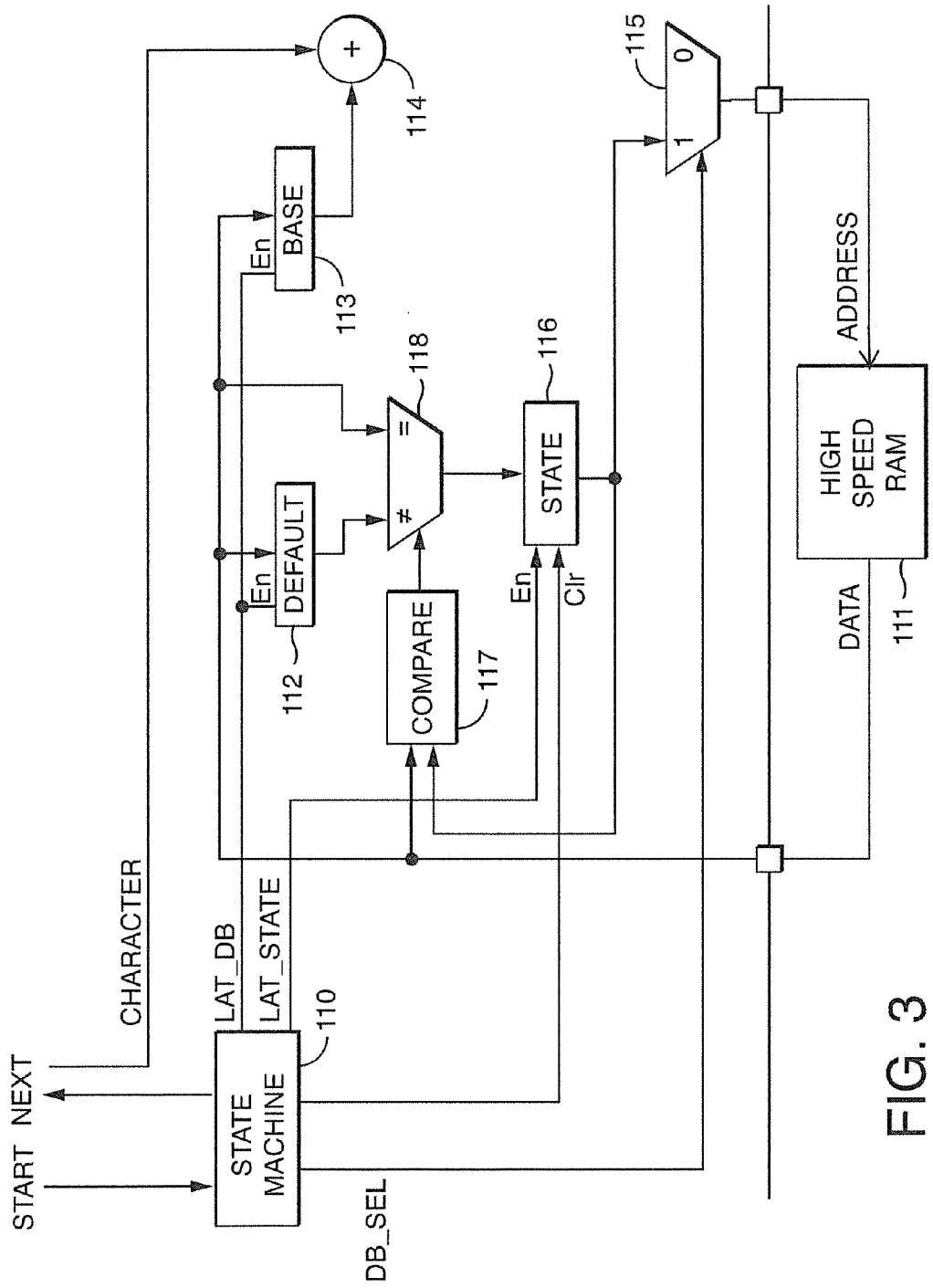
FIG. 3 illustrates a hardware version of a DFA

FIG. 3 illustrates one example of a hardware implementation of a Dual Table FSM suitable for an embodiment of the invention.

FIG. 3 includes a high-speed random-access memory (RAM) 111 which has address lines ADDRESS (shown as a single line, like all the other lines, for convenience) for an address value selected by a multiplexer 115. If a select signal DB_SEL from a controller 110, is 'clear', the multiplexer 115 selects an address value obtained by combining (as shown by the adder function 114) the incoming character (appearing on line CHARACTER) with the base offset provided by a base register 113. If the select signal DB_SEL is set, the multiplexer 115 selects the content of a state register 116. Also shown in FIG. 3, and operational as described below, are a default register 112, a comparator 117 and a multiplexer 118.

On start-up the START signal to the controller 110 will initialise, by way of the 'clear signal 'clr' the state register 116 to its initial state, state 0 as shown in the various graphs, and select the address to be presented to the (external) RAM 111 to be from the state register by setting the DB_SEL signal true. This in turn will address the 'default and base' entry for state 0 in the RAM 111 which will be presented on the RAM's data bus DATA after the access time of the RAM 111.

The incoming 'default and base' values will be stored in the respective default and base registers by the use of the LAT_DB signal of the state machine. Once these are stored the controller 110 will negate the DB_SEL signal, causing the address that is presented to the RAM 111 to be the value in the base register 113 plus the value of the incoming character. This value will address a 'next and check' entry in the RAM 111, and this entry will be presented on the RAM data bus DATA after the access time of the RAM.

From the incoming 'next and check' value the state check value will be compared against the current state value by comparator 117. If this comparison reports a match this means that the 'next and check' value access is valid for that state and character combination and is therefore a valid transition. The value of the 'next' state from the incoming 'next and check' value will therefore be loaded into the state register 116 through the use of the multiplexer 118.

If alternatively the comparison reports a mismatch between the state register value and the check state from incoming 'next and check' value a valid transition has not be found and through the multiplexer 118 the default state value stored on the previous RAM access is used to load the state register. There will now be a new state in the state register and a new character is accessed by the state machine while the whole process is repeated.

Header DFAs

Figure 4:
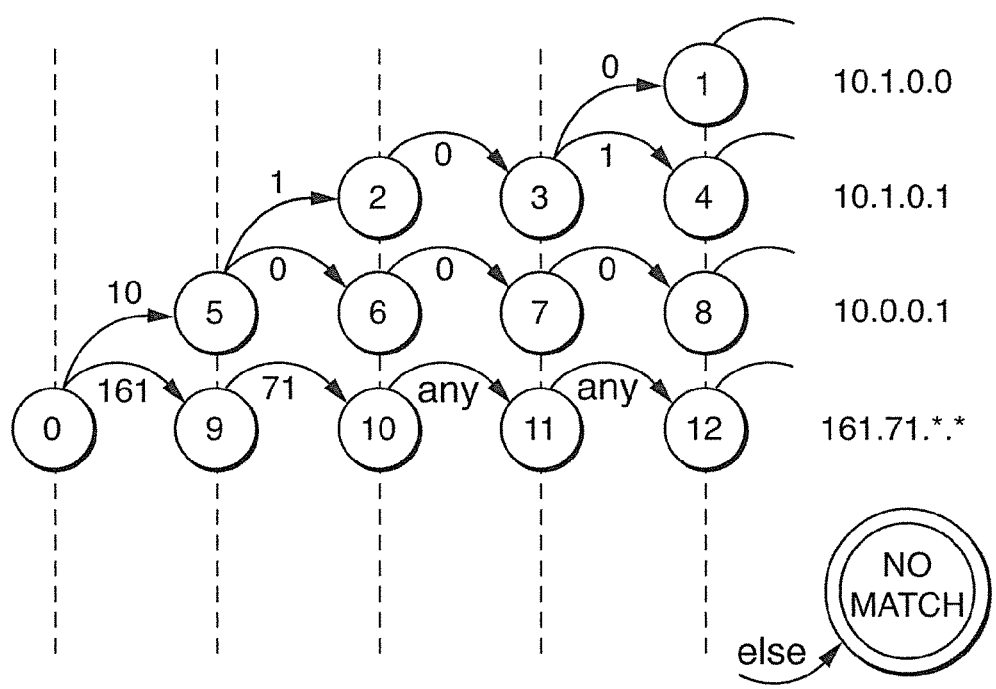
FIGS. 4 to 8 illustrate simple forms of header DFAs

FIG. 4 illustrates one example of a header DFA based on the modifications previously discussed. It illustrates a simple case of a DFA configured to perform matching against any of four four-character IP addresses 10.1.0.0, 10.1.0.1, 10.0.0.1 and 161.71.*.*, where * represents any value of the respective character. For any state there are only a forward transition (or several such forward transitions) and an else transition (shown just once for simplicity). The any transition is used where only a partial match of the first two bytes of the IP address is required, in particular for the IP address 161.71.*.*.

Thus on examination of the first character when the machine is in state 0 will cause transition to state 5 if the first character is '10' and to state 9 if the first character is 161. If the first character is any other value there is a transition to the 'no match' state. Similarly, when the machine is in state 5, the machine will transition to the state 2 if the second character is '1' and to the state 6 is the second character is '0'. Otherwise the machine will transition to the/no match' state. Note that there is no transition from state 5 to state 0 or to itself.

FIG. 4 omits for convenience the 'else' transitions that will be provided for all the states except states 10 and 11, which have 'any' value causing transition to states 11 and 12 respectively.

Figure 5:
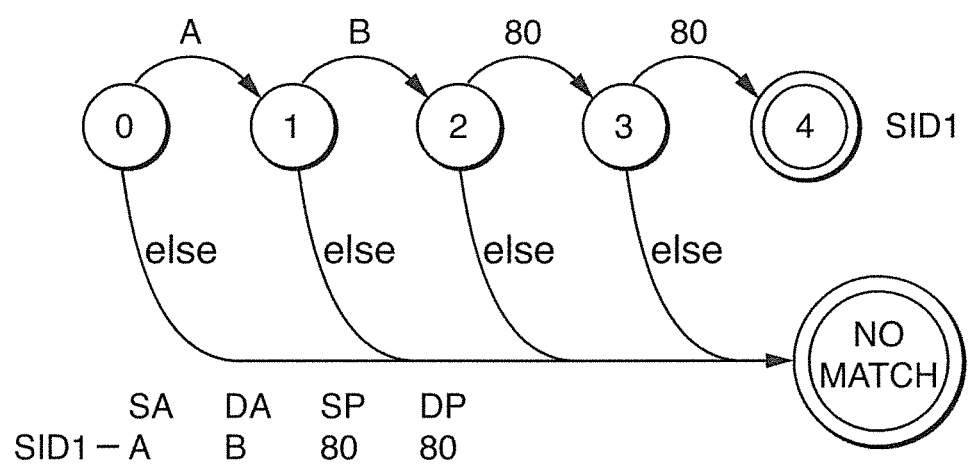
Figure 6:
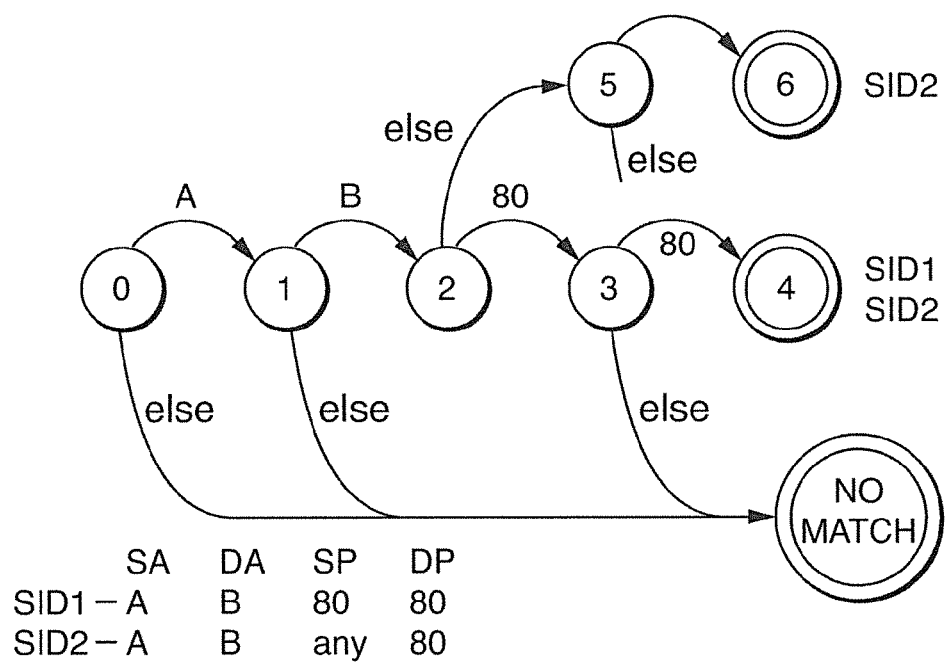
Figure 7:
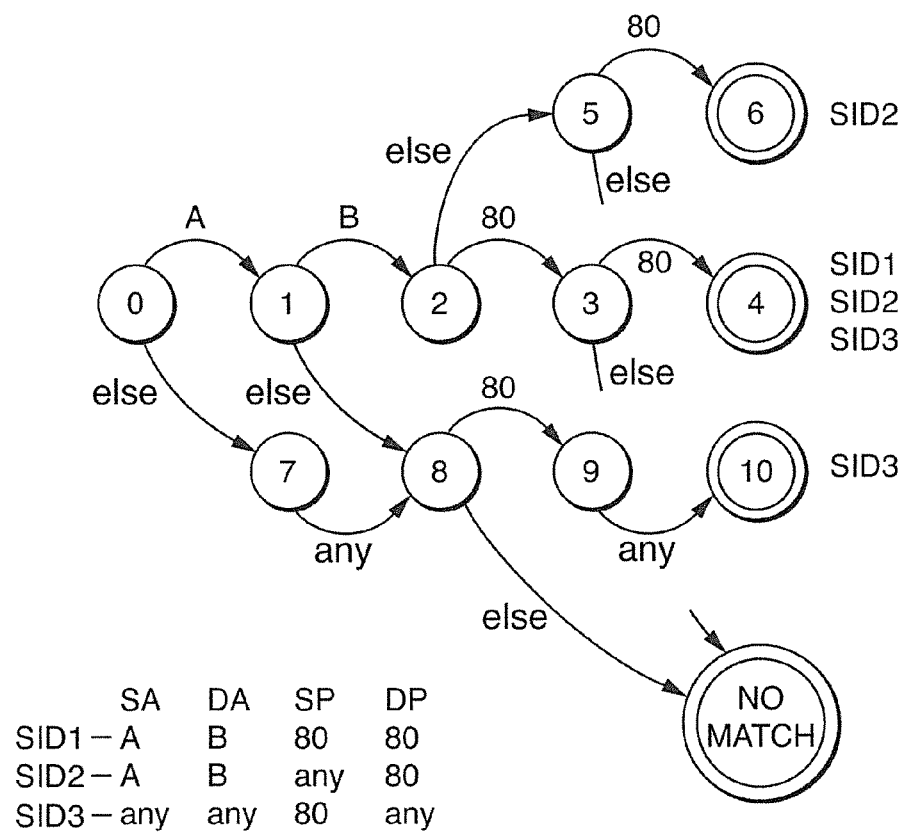

FIGS. 5 to 7 illustrate the construction of a slightly more complex set of 'Snort' IDs (SIDs). The respective DFAs are also illustrated at a more macro level whereby an IP address is represented by a single transition between states where in reality it would actually require four transitions, one for each byte, as in FIG. 4.

The three Snort IDs headers that are to be detected by the DFA are:

|       | SA  | DA  | SP  | DP  |
|-------|-----|-----|-----|-----|
| SID1 -| A   | B   | 80  | 80  |
| SID2 -| A   | B   | any | 80  |
| SID3 -| any | any | 80  | any | where SA is the network (IP) source address, DA is the network (IP) destination address, SP is the 'source port' and DP is the 'destination port' (in the 'application' layer)

The DFA for these SIDs can be constructed by adding each SID to the DFA, one at a time. FIG. 5 illustrates the DFA after the first SID is implemented. This DFA simply exits with a 'No Match' if the header does not precisely match DA=A, SA=B, SP=80, DP=80.

FIG. 6 illustrates the DFA once SID 2 is added. Since SID 2 has the same SA and DA requirements as SID 1 no additional states are required for the address checking part of the DFA. The application port checking however does have different requirements and in particular has a 'don't-care' condition on the SP of SID2. A branch is therefore added at this point in the DFA and the occurrence of 'any' SP followed by a DP=80 leads to a match on SID2. Note however that a header that would trigger SID 1 also matches the requirements of SID 2. The match state 4 is therefore also modified to indicate a match to SID 1 and SID 2.

FIG. 7 illustrates the DFA once SID 3 is added. In this case the SA and DA are don't-cares so new states have to be added for these. As with SID 2 above the condition for SID 1 also meets the conditions for SID 3 therefore the match state 4 has to be further modified to indicate a match to SID 1, SID 2 and SID 3.

Figure 8:
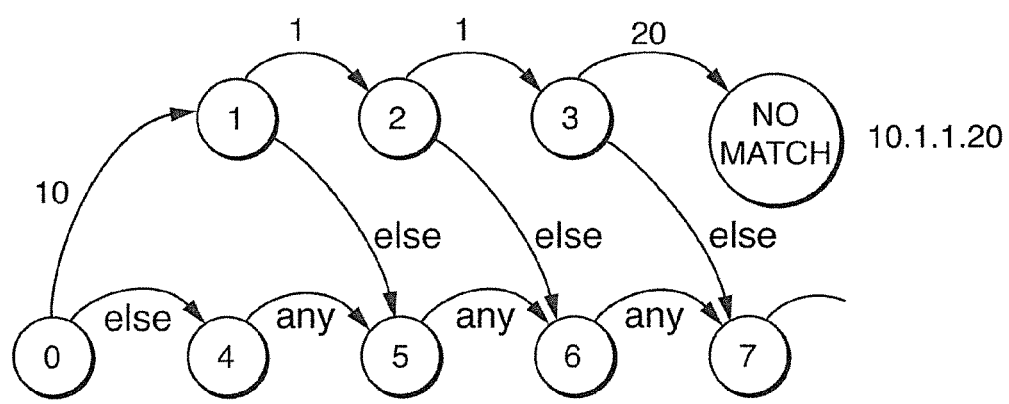

In some cases it may be necessary to exclude all packets with certain header contents from the remaining header checking as well as content checking. An example could be all traffic from a known trusted IP address on the network. Taking this as the example, FIG. 8 shows the DFA graph for excluding the IP address 10.1.1.20 from all remaining header and content checking while allowing any other IP address to continue. In particular, from each of the states 0, 1, 2 and 3 leading to the 'no match' state for the IP address 10.1.1.20 there is a forward 'else' transition to a state for the next character position.

Those familiar with dual-table implementation of a DFA will apprehend that although it might appear that for each state (assuming 256 possible values per character) there would be 255 paths to the 'next' state and only one to a default state, whereby to consume 255 entries in a 'next & check' table, space may be saved by reversing the significance of the ordinary 'next' and 'default' states.

Figure 9:
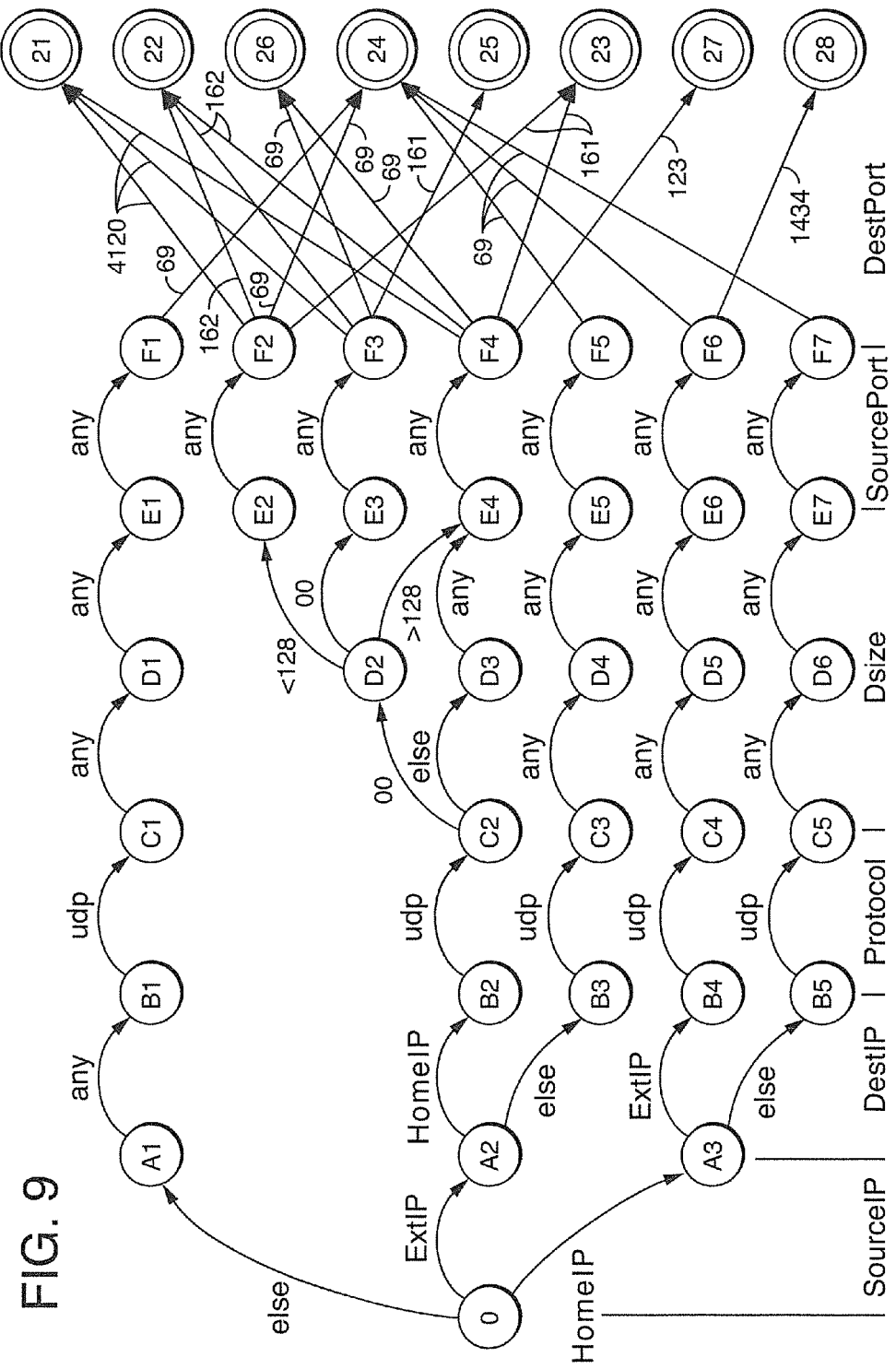
FIG. 9 illustrates a more complex header DFA

FIG. 9 is a DFA graph for a header DFA which performs the header matching for a multiplicity of rules. Most of the rules require both header and content checking—Rule 2 requires only header checking.

The graph indicates that the fields of the header of a packet will be examined in turn, the fields being (in this example) the IP source address, the IP destination address, the transmission protocol, the data size of the payload, the 'source port' (the number defining the source application) and the 'destination port' (the number defining the destination application). Thus from the default state 0 there will be as many transitions as there are characters in the source address required to reach any of the three states A1, A2 and A3 shown at the boundary between the 'sourceIP' and the 'DestIP' parts of the graph. The state reached at the end of the destination IP address will be any one of the states B1 to B5, the state reached at the end of the 'protocol' field will be any one of the states C1 to C5, the state reached at the end of the 'data size' field will be any one of the states D1 to D6, the state reached at the end of the 'source port' field will be any one of the states F1 to F7 and in this example the state reached at the end of the 'destination port field' will be any of the final states 21 to 28. However, the operation of the DFA may be terminated by the machine reaching the 'no match' state. In particular, all the rules discussed below are relevant only to 'udp' packets. Accordingly all the states B1 to B5 may have 'else' transitions to a 'no match' state, as described with reference to FIGS. 5 to 7 but omitted for simplicity from FIG. 15. The particular examples of the rules are shown in Table 1 below:

TABLE 1

| Rule # | Header match | | Content match |
|--------|--------------|---|---------------|
| Rule 1: | alert udp $EXTERNAL_NET any -> $HOME_NET | 161:162 | (content: "ABCD"; offset: 7; depth: 12;) |
| Rule 2: | alert udp $EXTERNAL_NET any -> $HOME_NET | 161 | |
| Rule 3: | alert udp $EXTERNAL_NET any -> $HOME_NET | 161 | (dsize: 0;) |
| Rule 4: | alert udp $EXTERNAL_NET any -> $HOME_NET | 4120 | (content: "D"; offset: 0, depth: 2;) |
| Rule 5: | alert udp $EXTERNAL_NET any -> $HOME_NET | 69 | (content: "EE"; offset: 2;) |
| Rule 6: | alert udp any any -> any | 69 | (content: "DC"; offset: 0; depth: 2; content: "E\|F.G\|H"; offset: 2; nocase;) |
| Rule 7: | alert udp $HOME_NET any -> $EXTERNAL_NET | 1434 | (content: "A"; depth: 1; content: "IJKC";) |
| Rule 8: | alert udp $EXTERNAL_NET any -> $HOME_NET | 123 | (dsize: >128;) |

Explanation of the Rules in Table 1

1. Some of the Rules in the table require a particular 'content', occurring in the payload, in combination with a particular header pattern (which includes 'don't care' for some of the header fields). The content part of these rules is not examined by the header DFA. In a preferred embodiment of the invention, the content rules and the header rules are all examined within a single DFA to be described later.
2. As described previously in relation to FIGS. 5 to 7, complexity arises if some rules prescribe a particular value for a header field and some do not. For example, Rule 6 applies irrespective of the destination IP address. However, there has to be a specific transition from state 0 to state A2 for a specific value of the source IP address, as in rules 1-5 and 8, and a transition to state A3 for a different specific value of the source IP address, as in rule 7. The effect is that there may be a multiplicity of paths through the graph to a given final state. A similar complexity arises because some rules, viz. Rules 3 and 8, specify limits on the data size, whereas for other Rules the respective criterion is 'don't care'. Thus Rule 6, which prescribes a UDP packet having a destination port value of '69' but otherwise is 'don't care' has a match state 24 which can be reached in a multiplicity of ways depending on (for example) the particular source IP address and the data size even though these values are 'don't care' in that Rule.
3. Since different Rules may specify (for example) the same destination port but may specify different values for earlier fields, such as Rules 2 and 3, there is not in general a one-to one correspondence between a Rule and the match states 21 to 28.

4. Match state 21 is reached in conformity with the header criteria of Rule 4 from any of states F2 to F4. Match state 22 is reached in conformity with the header criteria of Rule 1 from any of states F2 to F4. Match state 26 is reached in conformity with the header criteria of either Rule 5 or Rule 6. Match state 24 is reached in conformity with the header criteria only of Rule 6. Which of the states 24 or 26 is reached according to Rule 6 depends on whether the transition from state A2 is to state B2 or state B3. Match state 25 may be reached in conformity with the header criteria of any of Rules 1, 2 or 3. Match state 23 may be reached in conformity with the header criteria of either Rule 1 or 2. Match state 27 may be reached only in conformity with the header criteria of Rule 8 and is a final match state. Match state 28 may be reached only in conformity with the header criteria of Rule 7.

5. All the match states 21 to 28, with the exception of state 27, have to be followed by examination of content since the headers' patterns that lead to these states are header patterns specified for Rules that also specify content patterns. No such examination is required for state 27 since Rule 8 specifies only a header pattern, and that header pattern does not match the header pattern specified for any other rule. Reaching match state 23 indicates Rule 2 has been met, match state 25 that Rule 2 and 3 have been met, since these rules specify only header content. An examination of content still has to be performed however as these rules specify headers, that if found in conjunction with certain content, indicate the matching of other rules.

Combining Header Matching and Content Matching

Since the DFA graph used for the header matching is different from the DFA graph used for content matching—the header graph makes a transition on each character and the depth of the state into the DFA graph is directly related to the byte position in the header—this is not true for the content matching DFA—there is a variety of possibilities for the organisation of a DFA which performs both header and content matching. The general purpose in these schemes is to reduce and preferably eliminate post-processing, especially in software, to correlate content pattern matches with header matches.

Separate DFAs

For the sake of completeness, one considers the approach which is not to try to combine the DFAs and to have a separate one for the header matching from the one performing content matching with two separate root nodes. The header DFA is initially run in its one byte per state mode and any Match states reached and recorded —these can be considered partial SIDs or PSIDs. The content match DFA is then run and further Match states may be reached—these are also recorded as another set of PSIDs. A software process will then need to take these PSIDs and compare them to see if any represent the same SIDs—if so that SID has been detected. The process needs to take each Header PSID and then check to see if it in combination with the Content PSIDs found constitutes a SID. Note that for a particular header PSID there may be multiple Content PSID that are required for a SID to be detected. One exception is that if a 'No match' or 'Final' state is reached in the Header DFA, the processing for that stream is then complete and the content matching DFA need not be run.

Combined DFAs

Typically, as part of the header rule checking the type of the packet needs to also be determined (TCP, UDP, ICMP, etc.) as this is normally part of each rule. This means that if a match state is reached in the header rules, the type of the packet has at that point been determined. Now since each content rule has an associated header rule and each header rule includes a packet type it would be possible to sort the various content rules into groups associated with each packet type. An individual DFA graph could then be constructed to perform the content rule search for each packet type. This could provide an advantage over a single content rule DFA graph, which includes all content rules, as false positive content rule matches for content that is only relevant to other packet types would not longer occur. This should in turn reduce the amount of post processing required on the header and content rule matches returned. The only disadvantage with this approach is if there is duplication of content rules across different packet types, this in turn could lead to duplication in the DFA graphs for each packet type.

Assuming that multiple content rule DFA graphs were produced there are two approaches for combining the content rules and the header rules.

Packet-Type Based Combined DFA

Figure 10:
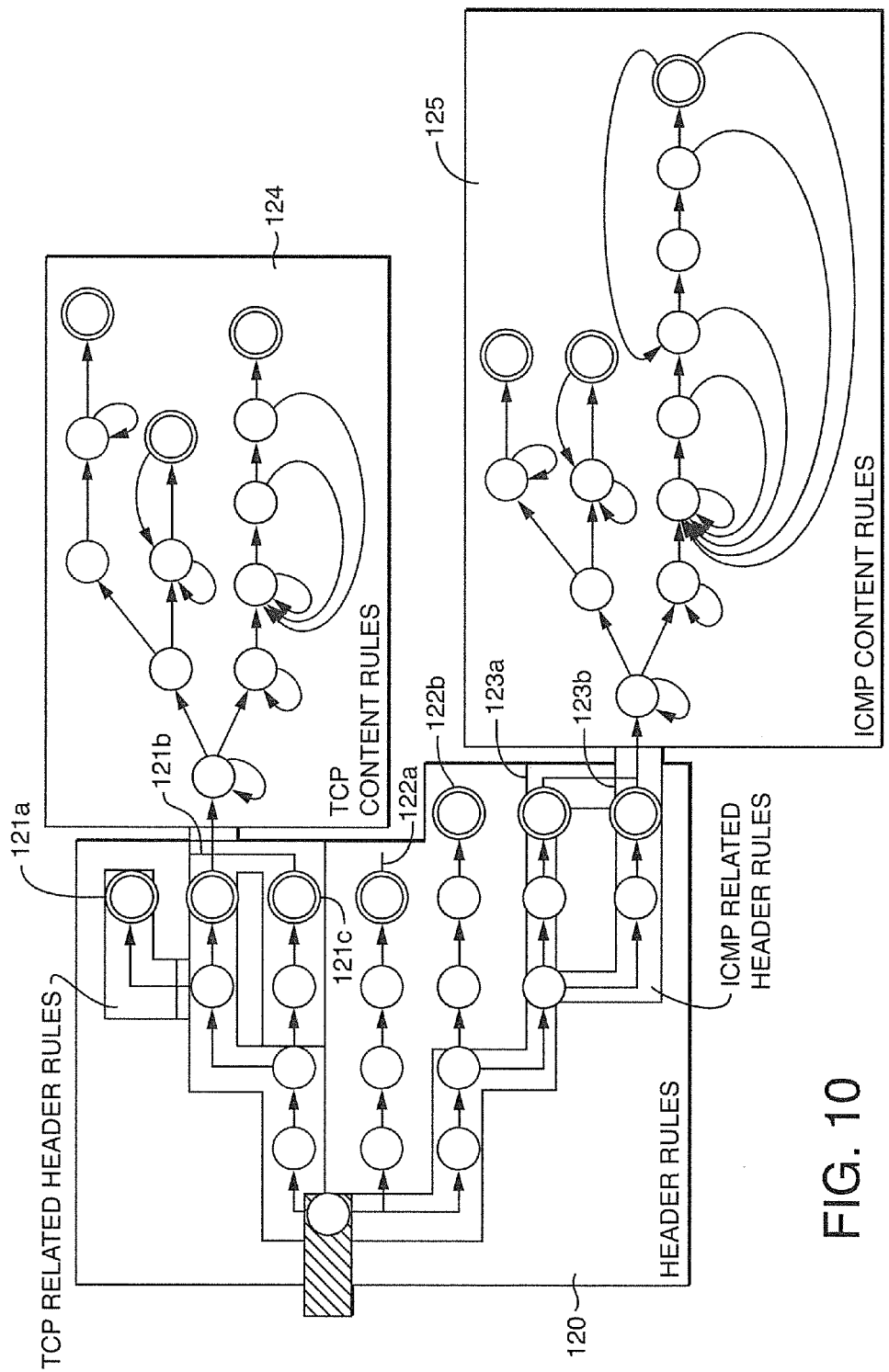
FIG. 10 illustrates one form of a combined DFA.

FIG. 10 illustrates one embodiment of a combined DFA which examines both header and content patterns.

The DFA in FIG. 10 comprises a header DFA 120, which may for example be a header DFA as previously described herein, particularly with reference to FIG. 9. The number of states and the number of characters in the header have both been reduced for simplicity. The header graph has an initial state (at the left), and a multiplicity of match states at the right of the graph. Match states 121*a* to 121*c* are in this example states which require (among other criteria) the protocol field to be a TCP field. Match states 123*a*-123*b* are in this example states which require (among other criteria) the protocol field to be a ICMP field match. The states 122*a* and 122*b* indicate match states for packets conforming to neither protocol; the related content rules have been omitted. Match state 121*a* is a final match state which does not require any post-match examination. Match states 121*b* and 121*c* are both match states which require post-match examination. They are both linked by an automatic transition (e.g. an 'any' transition) to the initial state of a TCP content rules DFA 124, which is shown with match states (the double circles) indicating the detection of different content patterns which are expected to occur within TCP packets. Likewise, match states 123*a* and 123*b* are both linked by automatic transitions to the initial state of an ICMP content rules DFA 125, which has various final match states.

The combined DFA as shown in FIG. 10 has some practical utility, since it may be employed to reduce substantially the occurrence of false positive. However, it does not remove the need for a post-processor to examine the actual header match and content match states to see if the combination conforms to a particular header/content rule. This need arises because all the header match states for a particular header type (in this case classified by protocol) transition to the single initial state of the respective content DFA graph.

Figure 11:
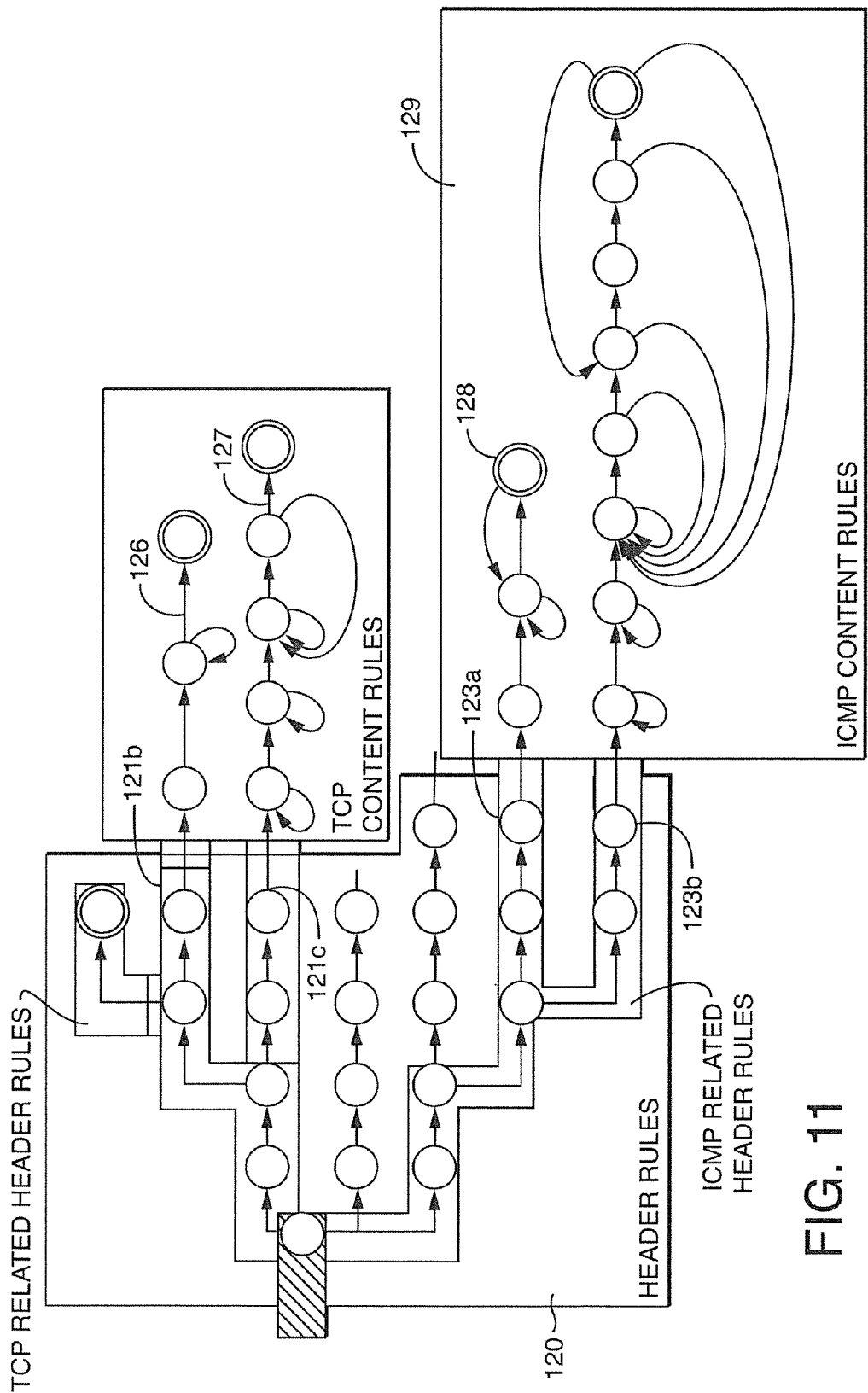
FIG. 11 illustrates another form of a combined DFA.

An alternative version of a combined header and content DFA is shown by way of example in FIG. 11. In this example, the header DFA 120 is again organised as previously described, for example with reference to FIG. 9. It has the same match states as described with reference to FIG. 10.

In the example of FIG. 11 however, each header match state, or at least each header match state that requires post match examination, has an automatic transition to a respective content DFA. Match state 121*b* transitions to the initial state of a first TCP content rule DFA 126, match state 121*c* transitions to the initial state of a second TCP content rule DFA 127, match state 123*a* transitions to the initial state of a first ICMP content rule DFA 128 and match state 123*b* transitions to the initial state of a second ICMP content rule DFA 129. In this form of combined DFA there will be as many content rule DFAs as there are header rule match states that require post-header match examination, but normally these DFAs will be much smaller than the content rule DFAs shown in FIG. 10.

A data stream that is constructed from multiple packets has to be processed as a single stream by a content rule DFA otherwise the risk is run that a pattern of interest that is distributed across the data payload of two packets may be missed. As described above there may be a possibility that the number of false positives could be reduced by the use of Header DFA result to select a more restrictive Content rule DFA to be run. This however does not eliminate the need to run the Header rules DFA on the header of each packet that forms a stream since a Header rule match may occur in any packet that forms a stream.

To account for this the following approach could be used. On the initial packet in a stream the Header rules DFA is run which in turn will lead into a particular Content rules DFA—the final state of the Header rules DFA that lead to this Content rule DFA to be selected will be recorded. Once the data payload within that packet is exhausted the context of the Content rule DFA will be recorded. When subsequent packets of the stream are received the Header of those packets will first be passed through the Header rules DFA and the final state of the Header rules DFA recorded. Once this is complete the data payload will be run through the Content rule DFA by reloading the recorded Content rule DFA context saved from the previous packet of the stream. In this way all packet headers of a stream will be checked against the Header rules DFA while the data stream formed by the data payload of the packets will have been examined by a single run of the Content rules DFA.

There are some additional considerations that need to be taken into account if the Header match DFA is used to select a particular Content DFA. If a single (large) Content rule DFA is run it will include all possible content matches. If however the Header DFA is used to select a particular Content DFA, only a subset of content rules will be run. This could present a problem if the initial packet Header rule DFA result select one particular Content rule DFA to be run while a subsequent packet Header would have actually required a different Content rule DFA to be run.

The magnitude of this problem depends in part on how specific the Header rule DFA match used to select the Content rule DFA is. It is preferable that the Header rule DFA only uses fields that will be constant from packet to packet in a stream. Fields that can change from packet to packet, while of course included in the Header content DFA, should not be able to change the Content rule DFA ultimately selected.

Examples of fields that cannot change within a stream are Source and Destination IP addresses; the Content rule DFA select can therefore be dependent on these. The 'flags' field however is something that can change from packet to packet, therefore this should not be able to influence the Content rule DFA selected. This ultimately will mean that different Header rule match states, that for example are different due to the Flags fields, will lead to the same Content rule DFA.

As previously mentioned, a DFA as used in the invention differs from ordinary DFAs. It has states which may be termed 'normal', which denotes a state from which there are merely transitions (in the case of a header DFA, only forward transitions). These are the states A1, B1, C1 . . . F7 as shown in FIG. 9. It will also have, in common with other DFAs, one or more 'match' states, each of which indicates that where the DFA has found a match. Examples of these are 22 and 23 in FIG. 9. In additional the header DFA graph may have a 'no match' state, indicating that absence of match and preferably indicating that the DFA may stop. Examples are shown in FIGS. 5-8 and but omitted for convenience from FIG. 9. Also, a header DFA graph may have at least one 'match and final' state which indicates not only a match but the end of the graph. One example is state 27 in FIG. 9, where the matching rule is fully satisfied by a particular header pattern irrespective of the packet's payload.

Accordingly when a 'match' state is reached it needs to be recorded and when a 'no match' or a 'match and final' state is reached the DFA preferably needs to be halted.

There are two techniques that could be used to mark 'match' and 'final' states. One would simply be to expand the fields within either the 'default and base' table or the of 'next and check' tables in memory so that states that are match or final states can be marked using for example a single bit flag field, which is read during the access of the table. If at any point the bit is found to be set the appropriate action can be taken.

An alternative, which would avoid having to add bits to memory, is to allocate the state number, which has a one-to-one mapping to the memory address in the 'Default and Base' entry, based on the type of state, either 'normal', 'match', 'final' or 'match and final'. The actual 'state numbers' allocated to each state in a DFA graph is arbitrary. For example, all the DFAs described here have a default or initial state denote with the state number '0'. However, any other number (within the numerical range of the memory) could be used provided that the respective tables (such as the 'default and base' table) use that number to indicate the default state where required.

Figure 12:
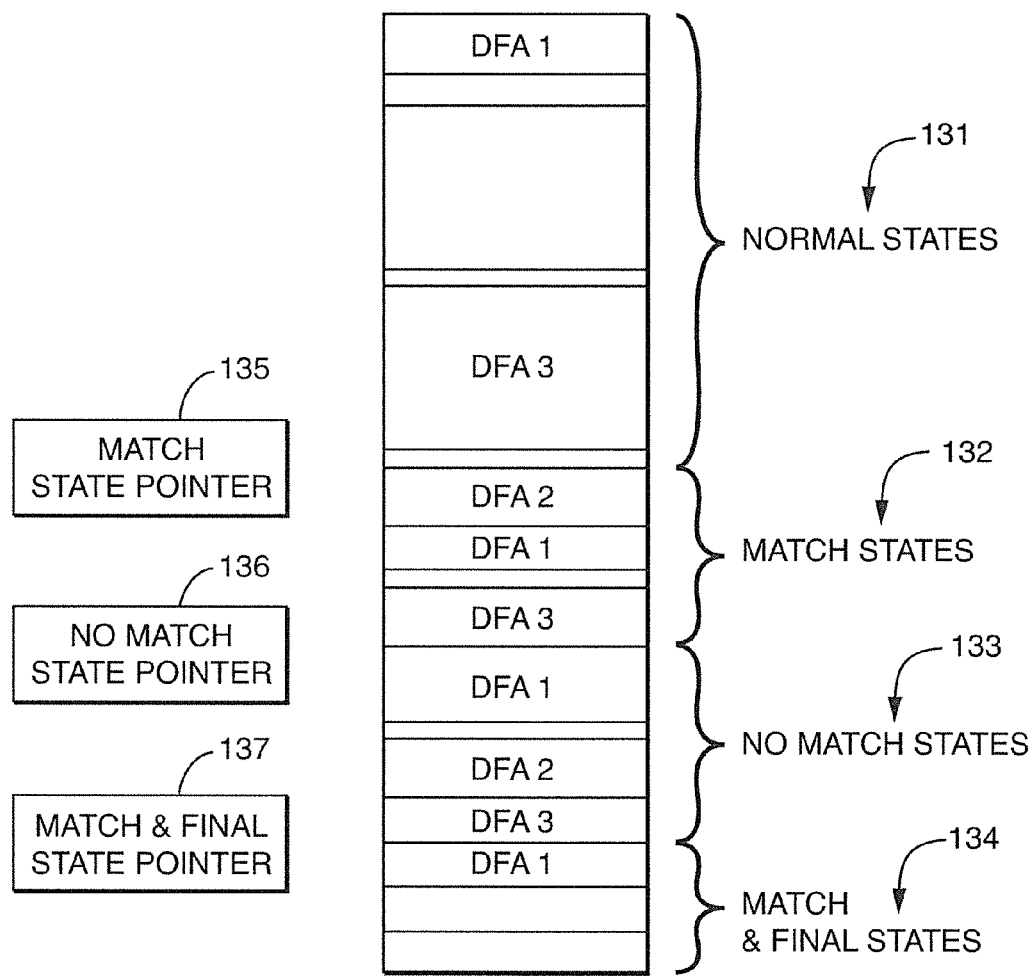
FIG. 12 illustrates a preferred manner of organising a memory

DFAs are normally organised with the aid of a compiler. Accordingly it is feasible to allocate the state numbers such that all 'normal' states are in one contiguous block, all states that are 'match' states are in another contiguous block, all states that are 'final' states are in another contiguous block and finally all states that are 'match and final' states are in another contiguous block. This is illustrated in FIG. 12, which shows all the 'normal' states (for three DFAs DFA1, DFA 2 and DFA 3) in a contiguous block 131, the match states for all three DFAs in another block 132, the 'no match' states in block 133 and the 'final and match' states in block 134. In the example there is no 'match and final' state for DFA 2.

The machine also needs a set of pointers to delineate the memory into the blocks that contain the respective types of states. The by means of comparators compare the state, which is simply the memory address being accessed, against the pointers. If for example the address accessed is within the range of the Match state block 132 that state is a Match state. It is not actually necessary to have a start and end pointer for each block. In the example of FIG. 11, there are only three pointers, a 'match state' pointer 135 which defines the end of the 'normal' state block 131 and the start of the 'match' state block 132, a 'no match' state pointer 136 which defines the end of the 'match' state block 132 and the start of the 'no match' state block 133 and a 'match & final' pointer 137 which defines the end of the 'no match' block 133 and the start of the 'final & match' block 134.

While there may be multiple DFA graphs stored within the memory, it is not necessary to have a respective set of pointers for each DFA graph. All that is necessary is that the compiler places each set of states types for each DFA, for example all 'match' states, within the area of memory configured for that state type. All that is required for DFA context is which DFA graph is being run. If a stream is being examined by a particular DFA graph, then the only states that DFA graph can reach are further states within the same graph. Multiple DFAs can therefore exist in the same memory. Unused memory can also exist, interspersed with, or at the end of, a particular state types block of memory. Since these states have no transitions to them they never can be reached.

While FIG. 12 illustrates the provision of the states of each DFA graph in a contiguous block of memory for convenience, even this is not necessary as a DFA graph will only ever traverse the states within that graph and the actual state numbers chosen are arbitrary. All that is required is that states are within the correct state type memory range; for example all match states must be within the defined range for 'match' states.

Rules DFA

It will now be understood that the results from a content DFA is a list of state numbers, being the match states in the content graph as the packet payload was processed as well as the offset from the start of the packet where these matches were found. The header DFA result is the single match state in the header graph that was reached as the packet header was processed.

The possible header states for the rules in table 1 have been shown in FIG. 9, wherein they are denoted 21 to 28.

Figure 13:
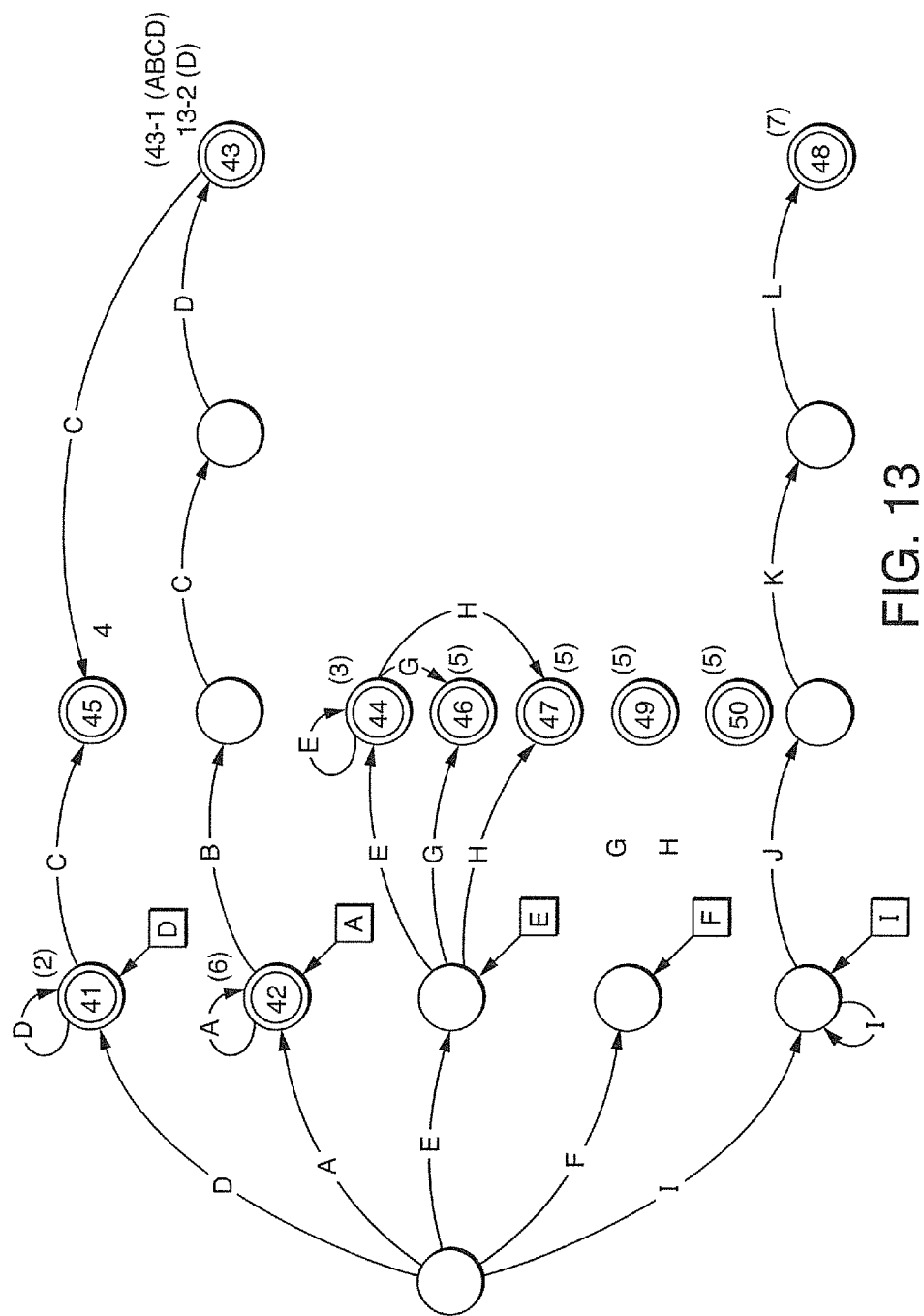
FIG. 13 illustrates a content DFA graph

FIG. 13 illustrates a content DFA graph for the content rules mentioned in Table 1. In FIG. 13, unnumbered states are intermediate states not indicating a match on the complete relevant string. The characters which give rise to transitions are shown each in a rectangular box in the respective transition. It may be seen that exit transitions from the initial state 0 are governed by the occurrence of a respective one of the characters 'A', 'D', 'E', 'F' and 'I'. The graph is organised for the detection of the content strings specified in the Rules 1 to 8 (as required) shown in Table 1 above. For example, occurrence of 'D' (Rule 4) is denoted by state 41. The occurrence of 'EE' is denoted by state 44 (Rule 5) and so on.

In a number of instances a character is shown in a box with an transition leading out of it but with no source for the transition, an example being the character 'D' leading to state 41. This represents a transition that will be taken from the current state when the character in the box is process on the condition that the current state does not have a specific transition marked for that particular character. If a specific transition is marked for the character from the current state then that transition will be taken. As an example the character 'D' will always lead to state 41 due to the 'D' leading to state 41 with the one exception where it leads to state 43 as that specifically marked transition will override the transition to state 41.

This graphical convention is only used to make the diagram clearer; a transition does exist in these cases from ever state for that particular character.

It should also be understood that the graph conforms to the convention that an 'else' on all states leads back to the root state.

It will now be understood that in compiling a header graph with predetermined match states and compiling a content graph likewise one can obtain a sequence of states, and in the case of a content DFA and offset of occurrence as well, each of which, instead of requiring an examination of an input character for determining a transition from a current state, needs an examination to determine whether this state was recorded in proper sequence.

Therefore, it is now possible to construct a 'Rules' DFA which reaches a final match not by determining whether a string of characters contains a predetermined sequence of characters but whether a string of match states contains a predetermined sequence of such match states; preferably such a sequence contains both a header match and a content match; this may therefore be termed a 'Rules' DFA, characterised by a 'Rules' graph.

Figure 14:
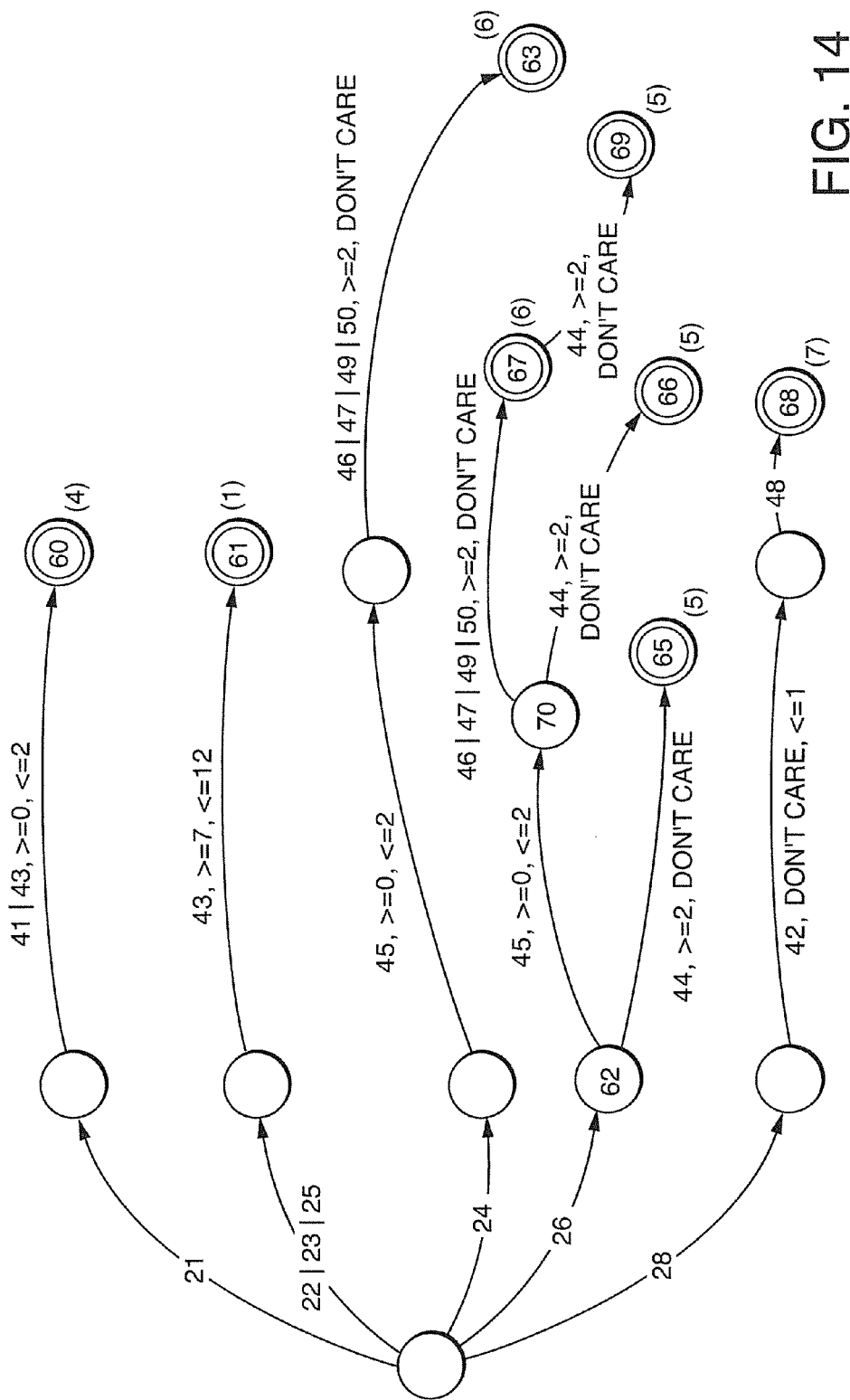
FIG. 14 illustrates a graph for a rules DFA.

FIG. 14 illustrates the graph of a Rules DFA according to the invention. This is based on the graphs shown in FIG. 9 and FIG. 13. The initial state (0) is at the left. The exit transitions from this state are denoted 21, 22, 23, 24, 25, 26 and 28. These are the state numbers for the match states in the header graph of FIG. 9, with the exception of state 27, which is a final match state that does not require any post-match examination, in accordance with Rule 2 in Table 1. The numbers in the circles are state numbers, which can be allotted during compiling as previously described. The boxes in the transition indicate the state that occurs, not the original character. Where more than one state is shown in the box, any of the states indicated may cause the relevant transition.

For most of the transitions in the graph shown in FIG. 14 the box specifies not only the state in the content graph but also values for each of 'offset' and 'depth'. The term 'depth' specifies how far into a packet one should look for a specified content string; the term 'offset' specifies how far into a packet one may stop looking for the previously specified content string. Either value may be 'don't care.'

Figure 15:
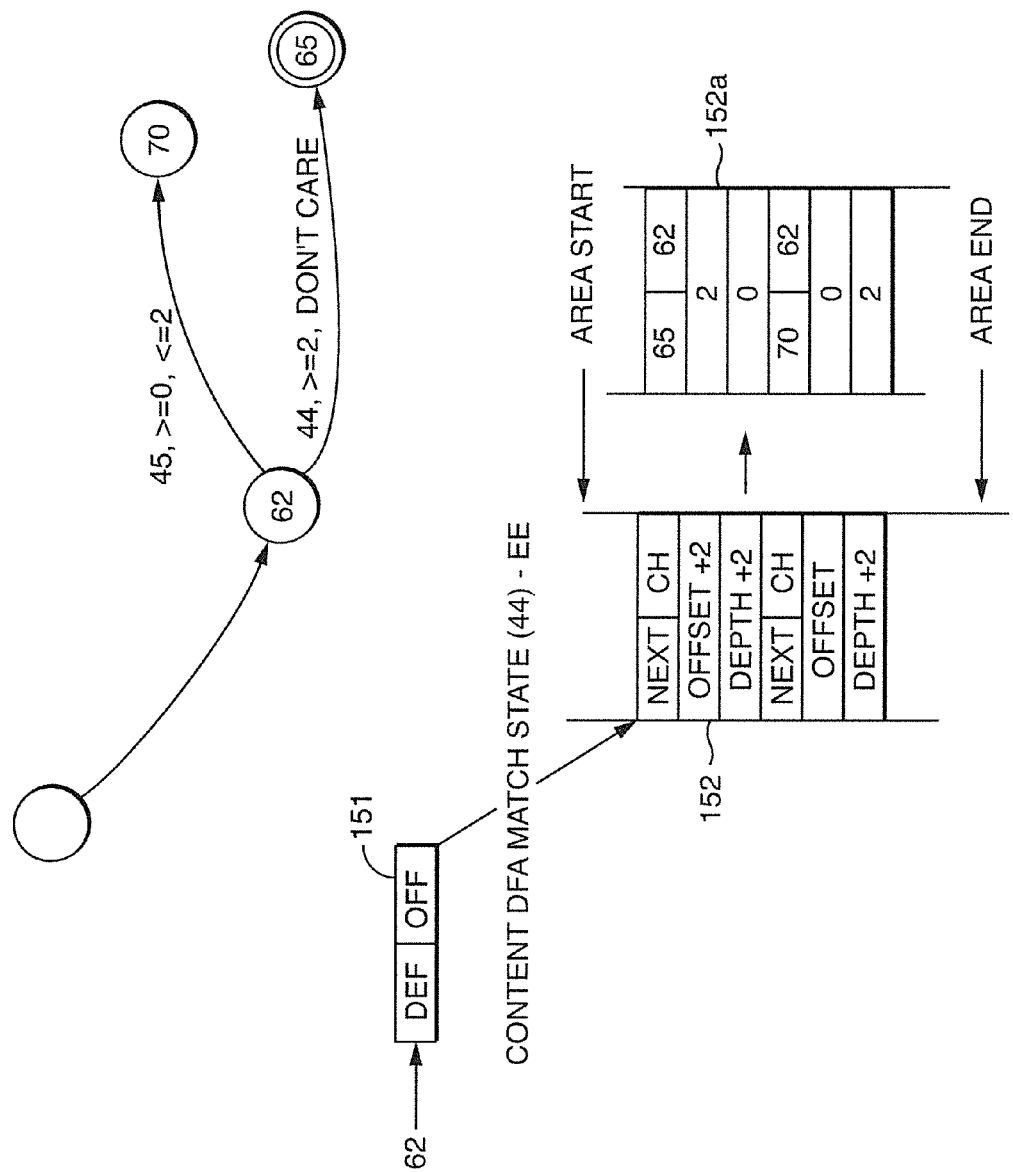
FIG. 15 illustrates part of the graph shown in FIG. 14 and an associated part of the memory.

FIG. 15 illustrates part of the DFA graph of FIG. 14 as well as the associated table entries for the state transitions from state 62 (arbitrarily assigned). There are two transitions from this state, taken when the next state in the 'state list' (as described below) is 44 or 45. Each transition includes a rule specifying 'offset' and 'depth', as noted above. To implement these rules again a special area of memory will be defined by pointers. In this case the Next and Check memory expanded to include the addition of depth and offset information. Since it is the end of the pattern that causes the match state in the content DFA, and therefore the state and offset to be marked in the 'state list', the offset and depth has to be adjusted by the addition of the length of the string during compilation. A 'don't care' for depth can be configured by setting the depth to zero as this results in the same thing. A 'don't care' for the offset can be indicated again by the use of zero, but in this case has to be interpreted. Stopping the search at zero, in other words before it starts, will not be used so this can be used to indicate no limit on how far into the string that the pattern can be detected.

Thus, referring to FIG. 15, the transition from state 62 in the Rules DFA to state 65 requires that the next content DFA match state to have occurred (as indicated by the list described below) should have been state 44 in the Content DFA. The next and check values in the 'Next and Check' table 152 are 65 and 62. The 'table' at the bottom right shows example of the fields in the table. For the transition to state 65, the offset is equal to or greater than 2 whereas the depth is 'don't care', represented by zero.

FIG. 15 also shows the entries in the 'Next and Check' table for the transition from state 62 in the Rules DFA to state 70. This requires the occurrence in proper sequence of the state 45 in the content DFA with 'don't care' for offset and depth equal to 2 or less.

Figure 16:
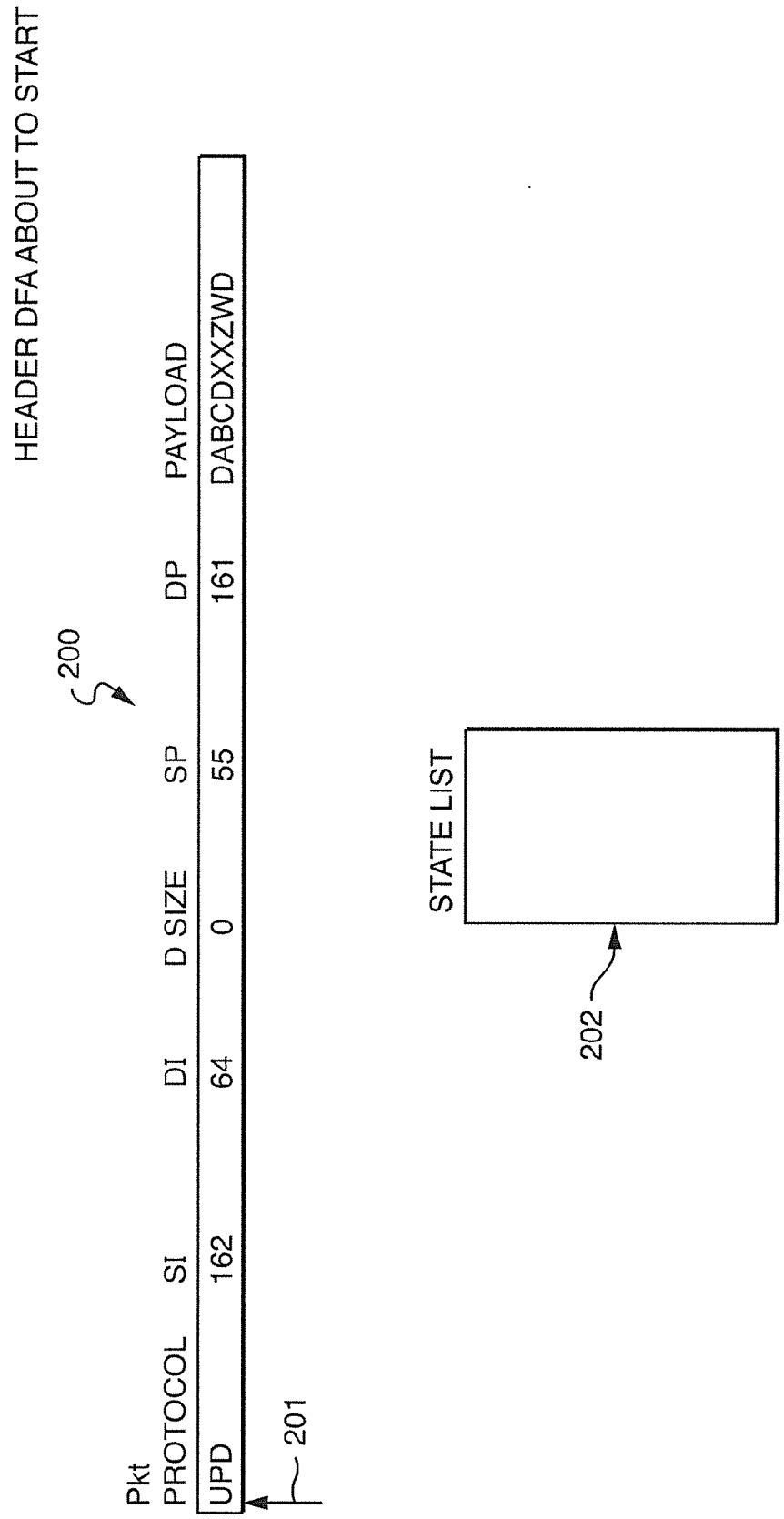
FIG. 16 illustrates schematically one example of the processing of a packet and a state list when a header DFA is about to start
Figure 17:
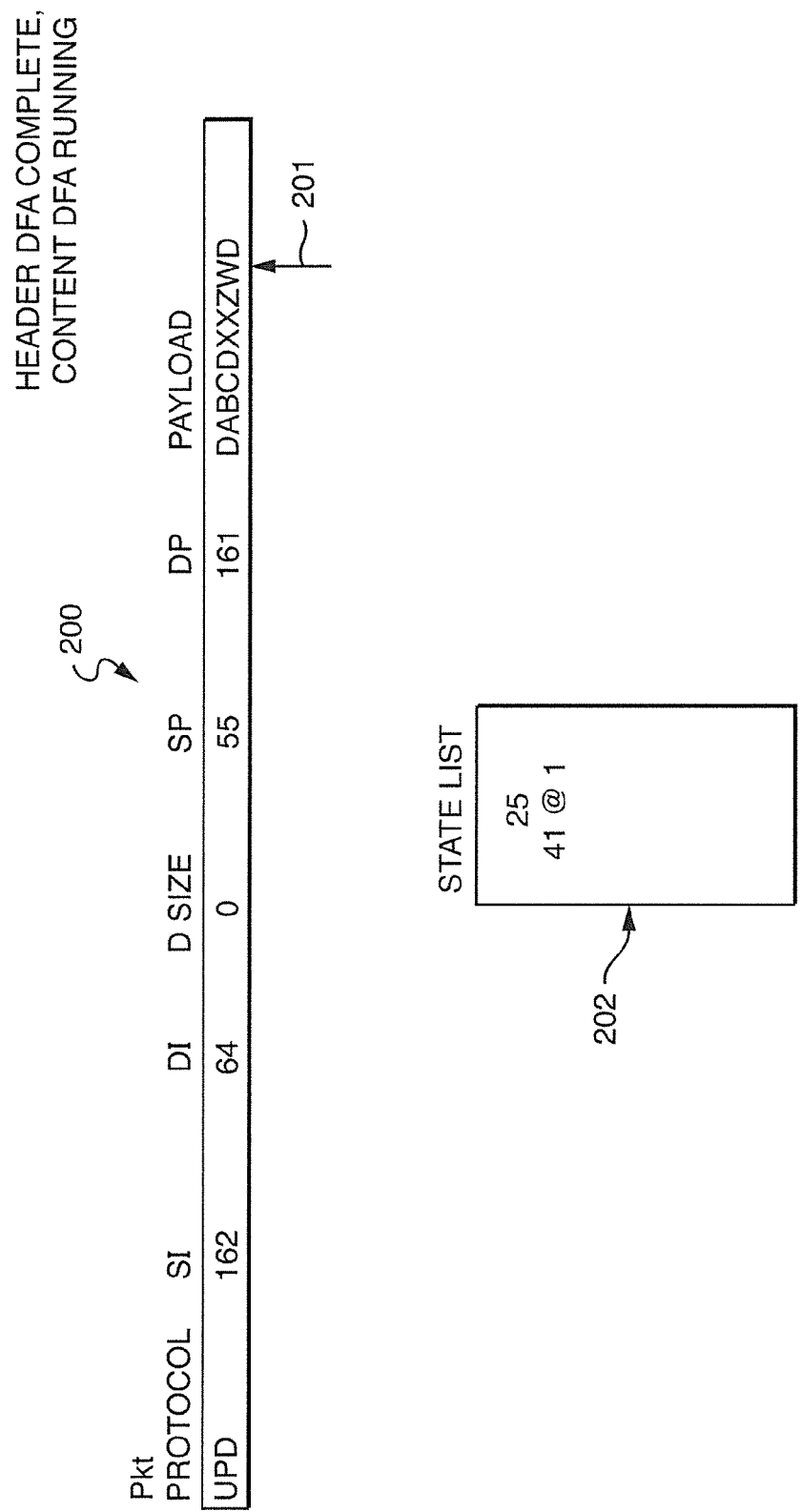
FIG. 17 illustrates schematically the example of FIG. 16 when the header DFA is complete and the content DFA is running.
Figure 18:
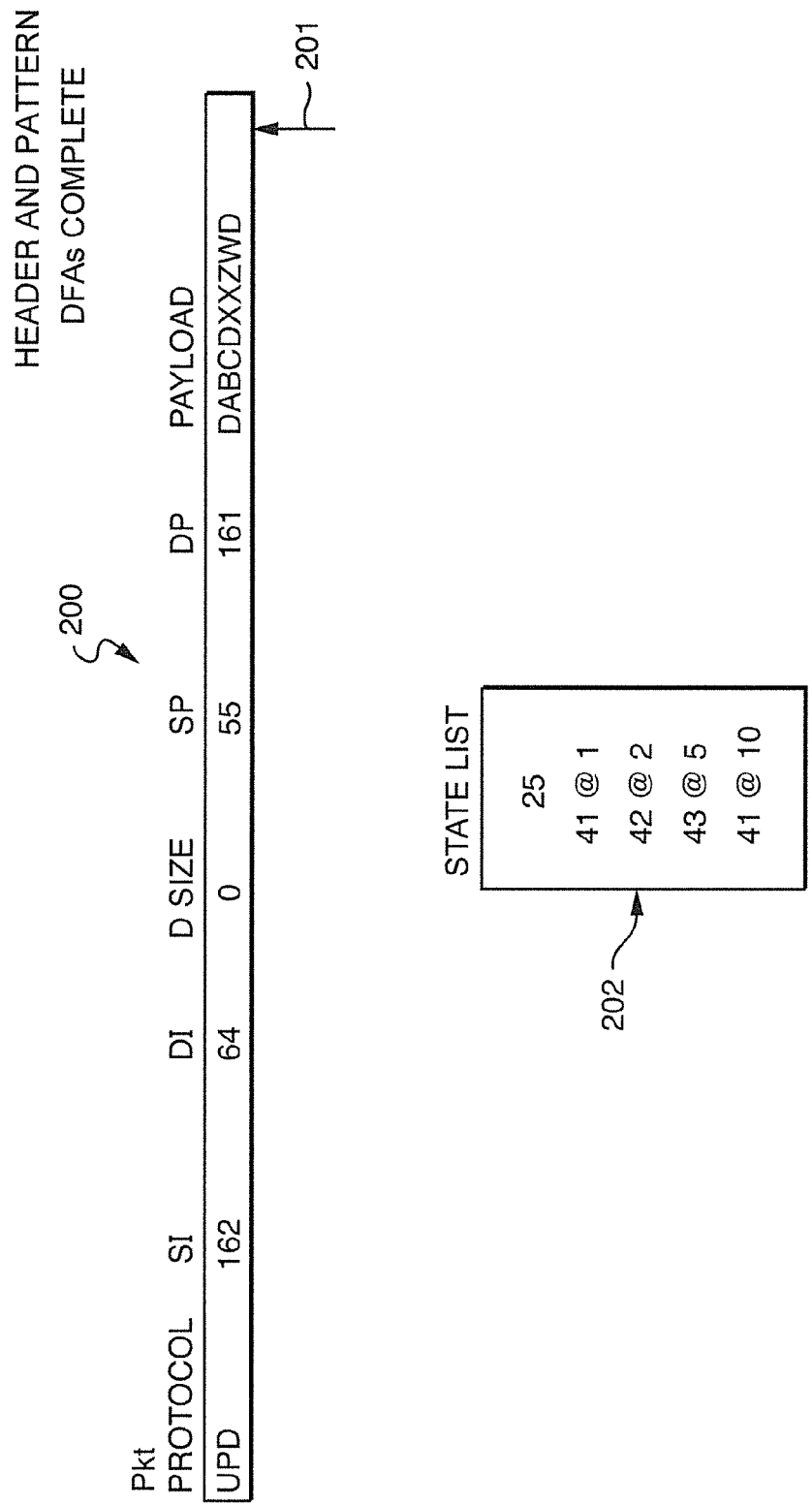
FIG. 18 illustrates schematically the example of FIG. 16 when the header and content DFAs are complete.

FIGS. 16 to 18 illustrate by way of example the processing of a packet 200 by means of a header DFA as shown in FIG. 9 and a content DFA as shown in FIG. 13 so as to obtain a results list which is in effect a 'string' of states that can be examined by a Rules DFA as shown in FIG. 14.

It is assumed (by way of example) in relation to FIGS. 16 to 18 that the variable $HOME_NET is set to 64 and the variable $EXTERNAL_NET is set to be not equal to 64.

In the example the header (much simplified for ease of understanding) of the packet specifies the transmission protocol, in the case 'UDP', a source IP address (SI), a destination IP address (DI), a data size (0), a source port, specifically 55, and a destination port, specifically 161. The packet is shown as having a payload consisting of the characters DAB-CDXXZWD. SI is 164 matching $EXTERNAL_NET and DI is 64 matching $HOME_NET.

FIG. 16 shows the header DFA about to start, as indicated by the arrow 201 pointing vertically to the beginning of the header. At this time the state list 202, shown below the packet, is empty, no match states having yet been detected. This state list is readily constructed employing techniques known per se, i.e. including a byte counter (for the offset into the packet).

In FIG. 17 the arrow points at the payload. Thus the header DFA has finished but the content DFA is still running. The header in these FIGS. 16 to 18 conforms to Rules 2 and 3 in Table 1, SI and DI being 164, matching 'any', the protocol being UDP, the Dsize=0, the source port being 'any' and the destination port being 161. Therefore state 25 in the header DFA (FIG. 9) will be reached and the occurrence of this state is recorded as the first state in the state list. Note again that the number (25) is arbitrary, being merely the number allotted to that state in the header DFA graph. It indicates that both Rules 2 and 3 in Table 1 have been matched since these rules require only that a specific header pattern be found irrespective of the packet's payload. Additionally the header portion of Rule 1 has been matched although Rule 1 itself will only be matched dependent on the contents matches that are recorded.

Furthermore, the processing of the payload by the content DFA has yielded state 41, which is attained because the first character in the payload is 'D', at offset=1. This accounts for the second entry in the results list, namely '41 @ 1', i.e. the (arbitrary) state number in the content DFA, and the offset into the payload at which occurred the character that determined entry into the state.

FIG. 18 illustrates the completion of processing by the content DFA as well as the header DFA. The examination of the payload has produced three more matches, indicated by the attainment by the content DFA of state 42 on detection of the character (A) at offset=2, state 43 on detection of character D in the string ABCD offset=5 (i.e. detection of the string ABCD) and state 41 on detection of the character D at offset=10. It is this state list which is now examined by the Rules DFA for conformity with any of the rules defined in the Rules DFA.

The invention claimed is:

1. A network security system comprising:
   a memory on which is stored machine readable instructions to:
      access a character stream that includes both a header and a payload of at least one addressed data packet;
      determine, through use of a deterministic finite automata, whether the character stream matches a predetermined digital signature, wherein the match is defined by a rule that specifies at least one header match denoted by attainment of a respective match state, and at least one content match denoted by attainment of a respective match state, and wherein the deterministic finite automata includes a multiplicity of states and a multiplicity of transitions between states, each of the transitions requiring the occurrence in proper sequence of a respective one of said match states in a string of match states; and
   a processor to execute the machine readable instructions.

2. The network security system according to claim 1, wherein the machine readable instructions are further to:
   examine entries in a list of match states compiled in sequence through examination of the header and the payload of the at least one addressed data packet.

3. The network security system according to claim 2, wherein said list specifies, in respect of a content match, a position in the at least one addressed data packet at which the content match was detected and wherein the deterministic finite automata determines whether said position is within a specified range.

4. The network security system according to claim 1, further comprising:
   a random access memory to define the states of the deterministic finite automata and the transitions between the multiplicity of states, the random access memory defining first and second tables of which a first table includes pointers to access the second table and said second table includes entries defining values for a current state and a next state of the deterministic finite automata.

5. The network security system according to claim 4, wherein the random access memory is partitioned into blocks wherein entries within each of the blocks represent different kinds of state of the deterministic finite automata.

6. The network security system according to claim 5, wherein said second table includes, for at least some entries defining content match states, values defining a range within which a respective content match may validly occur.

7. The network security system according to claim 6, wherein said different kinds of state include intermediate states not indicating a match, match states indicating a match, and states indicating the absence of a match.

8. The network security system according to claim 5, wherein said blocks contain similar states for each of a plurality of the deterministic finite automata.

9. The network security system according to claim 1, wherein, to determine whether the character stream matches a predetermined digital signature, the machine readable instructions are further to:
   determine whether there is a match state of the header through use of a first deterministic finite automata having an initial state, intermediate states, and at least one header match state, wherein there is at least one state for every character position within the header, and wherein the first deterministic finite automata is to detect by entry into said match state, a header match of a string of header characters with a header rule that specifies the locations within the header of predetermined characters.

10. The network security system according to claim 9, wherein, to determine whether the character stream matches a predetermined digital signature, the machine readable instructions are further to:
   determine whether there is a match state of the content through use of a second deterministic finite automata having an initial state, intermediate states, and at least one content match state, and wherein the second deterministic finite automata is, by way of entry into said content match state, to detect a content match between a character set in said payload characters and at least one content rule specifying the occurrence of a predetermined sequence of characters; and
   wherein the deterministic finite automata is to transition between a header match state in said first deterministic finite automata to the initial state in said second deterministic finite automata.

11. The network security system according to claim 10, wherein said initial state in said second deterministic finite automata is coupled for automatic transition from a plurality of header match states in said first deterministic finite automata.

12. The network security system according to claim 10, wherein each of a plurality of header match states in said first deterministic finite automata is coupled to a respective initial state in a respective one of a plurality of second deterministic finite automata.

13. A network security system comprising:
a memory on which is stored a deterministic finite automata that includes a multiplicity of states and a multiplicity of transitions between states, each of the transitions requiring the occurrence in proper sequence of a respective one of said match states in a string of match states; and
an apparatus in communication with the memory, wherein the apparatus is to determine, through implementation of the deterministic finite automata, whether a character stream that includes both a header and a payload of at least one addressed data packet stream matches a predetermined digital signature, wherein the match is defined by a rule that specifies at least one header match denoted by attainment of a respective match state and at least one content match denoted by attainment of a respective match state.

14. The network security system according to claim 13, wherein the apparatus is further to:
(a) specify some of said multiplicity of states as match states denoting the detection of at least one respective character string in the stream;
(b) examine the characters in the stream and to control the transitions in dependence on whether the character stream conforms to predetermined sequences of characters so that the deterministic finite automata enters in turn a string of match states; and
(c) examine said string of match states in turn to determine whether those match states conform to a predetermined sequence of match states,
wherein at least one of the match states in said string denotes a match between a header of a data packet in said stream and a respective header matching rule; and
wherein at least one other of said match states in said string denotes a match between the content of at least one data packet in said stream and a respective content matching rule.

15. The network security system according to claim 13, wherein the apparatus is further to:
examine entries in a list of match states compiled in sequence through examination of the header and the payload of the at least one addressed data packet; and
wherein said list specifies, in respect of a content match, a position in the at least one addressed data packet at which the content match was detected and wherein the deterministic finite automata determines whether said position is within a specified range.

16. The network security system according to claim 13, further comprising:
a random access memory to define states of the deterministic finite automata and the transitions between the multiplicity of states, the random access memory defining first and second tables of which a first table includes pointers to access the second table and said second table including entries defining values for a current state and a next state of the deterministic finite automata.

17. The network security system according to claim 13, wherein, to determine whether the character stream matches a predetermined digital signature, the apparatus is further to:
determine whether there is a match state of the header through use of a first deterministic finite automata having an initial state, intermediate states, and at least one header match state, wherein there is at least one state for every character position within the header, and wherein the first deterministic finite automata is to detect by entry into said match state, a header match of a string of header characters with a header rule that specifies the locations within the header of predetermined characters.

18. The network security system according to claim 17, wherein, to determine whether the character stream matches a predetermined digital signature, the apparatus is further to:
determine whether there is a match state of the content through use of a second deterministic finite automata having an initial state, intermediate states, and at least one content match state, and wherein the second deterministic finite automata is, by way of entry into said content match state, to detect a content match between a character set in said payload characters and at least one content rule specifying the occurrence of a predetermined sequence of characters; and
wherein the deterministic finite automata is to transition between a header match state in said first deterministic finite automata to the initial state in said second deterministic finite automata.

19. A method of operating a network security system, the method comprising:
accessing a character stream that includes both a header and a payload of at least one addressed data packet; and
determining, by a processor, through use of a deterministic finite automata, whether the character stream matches a predetermined digital signature, wherein the match is defined by a rule that specifies at least one header match denoted by attainment of a respective match state, and at least one content match denoted by attainment of a respective match state, and wherein the deterministic finite automata includes a multiplicity of states and a multiplicity of transitions between states, each of the transitions requiring the occurrence in proper sequence of a respective one of said match states in a string of match states.

20. The method according to claim 19, wherein determining whether the character stream matches a predetermined digital signature further comprises:
determining whether there is a match state of the header through use of a first deterministic finite automata having an initial state, intermediate states, and at least one header match state, wherein there is at least one state for every character position within the header, and wherein the first deterministic finite automata is to detect by entry into said match state, a header match of a string of header characters with a header rule that specifies the locations within the header of predetermined characters;
determining whether there is a match state of the content through use of a second deterministic finite automata having an initial state, intermediate states, and at least one content match state, and wherein the second deterministic finite automata is, by way of entry into said content match state, to detect a content match between a character set in said payload characters and at least one content rule specifying the occurrence of a predetermined sequence of characters; and
wherein the deterministic finite automata is to transition between a header match state in said first deterministic finite automata to the initial state in said second deterministic finite automata.

* * * * *

UNITED STATES PATENT AND TRADEMARK OFFICE
CERTIFICATE OF CORRECTION

| | |
|---|---|
| PATENT NO. | : 8,665,911 B2 |
| APPLICATION NO. | : 13/668001 |
| DATED | : March 4, 2014 |
| INVENTOR(S) | : David Law et al. |

Page 1 of 1

It is certified that error appears in the above-identified patent and that said Letters Patent is hereby corrected as shown below:

In the Specification

In column 1, line 3, below "STATE MACHINES" insert -- CLAIM FOR PRIORITY --.

Signed and Sealed this
Twenty-fourth Day of June, 2014

Michelle K. Lee
*Deputy Director of the United States Patent and Trademark Office*